US012782689B2

(12) United States Patent
Cho et al.

(10) Patent No.: US 12,782,689 B2
(45) Date of Patent: Nov. 3, 2026

(54) OPTICAL IMAGING SYSTEM COMPRISING A PRISM DISPOSED BETWEEN A FIRST LENS GROUP AND A SECOND LENS GROUP

(71) Applicant: SAMSUNG ELECTRO-MECHANICS CO., LTD., Suwon-si (KR)

(72) Inventors: Seong Il Cho, Suwon-si (KR); You Jin Jeong, Suwon-si (KR); Yong Joo Jo, Suwon-si (KR)

(73) Assignee: Samsung Electro-Mechanics Co., Ltd., Suwon-si (KR)

( * ) Notice: Subject to any disclaimer, the term of this patent is extended or adjusted under 35 U.S.C. 154(b) by 254 days.

(21) Appl. No.: 18/668,396

(22) Filed: May 20, 2024

(65) Prior Publication Data

US 2025/0130401 A1 Apr. 24, 2025

(30) Foreign Application Priority Data

Oct. 18, 2023 (KR) ........................ 10-2023-0139617

(51) Int. Cl.
*G02B 13/00* (2006.01)
*G02B 9/04* (2006.01)

(52) U.S. Cl.
CPC ........... *G02B 13/0045* (2013.01); *G02B 9/04* (2013.01); *G02B 13/0065* (2013.01)

(58) Field of Classification Search
CPC .................. G02B 9/04; G02B 15/1421; G02B 2003/0093
See application file for complete search history.

(56) References Cited

U.S. PATENT DOCUMENTS

2015/0253647 A1* 9/2015 Mercado .............. G02B 13/007 359/708
2016/0170175 A1* 6/2016 Chang ................ G02B 13/0045 359/708
2020/0319432 A1 10/2020 Choi et al.
2021/0096325 A1* 4/2021 Wu .................... G02B 13/0045
2023/0121630 A1* 4/2023 Fu .......................... G02B 13/06 359/713

FOREIGN PATENT DOCUMENTS

CN 110488469 A 11/2019
KR 10-2163870 B1 10/2020
KR 10-2022-0140041 A 10/2022

* cited by examiner

*Primary Examiner* — Paul C Lee
(74) *Attorney, Agent, or Firm* — NSIP Law

(57) ABSTRACT

An optical imaging system is provided. The optical imaging system includes a first lens group including at least one lens disposed toward a first optical axis; a second lens group including at least one lens disposed in a second optical axis direction perpendicular to the first optical axis direction; and a prism disposed between the first lens group and the second lens group and configured to convert a path of incident light from the first optical axis direction to the second optical axis direction, wherein the conditional expression 0.200≤D1/OAL2≤0.500 is satisfied, wherein D1 is a maximum effective diameter of the first lens group, and OAL2 is a distance on a second optical axis from a reflective surface of the prism to an imaging plane.

17 Claims, 20 Drawing Sheets

OPTICAL IMAGING SYSTEM COMPRISING A PRISM DISPOSED BETWEEN A FIRST LENS GROUP AND A SECOND LENS GROUP

CROSS-REFERENCE TO RELATED APPLICATIONS

This application claims the benefit under 35 USC § 119 (a) of Korean Patent Application No. 10-2023-0139617 filed on Oct. 18, 2023, in the Korean Intellectual Property Office, the entire disclosure of which is incorporated herein by reference for all purposes.

BACKGROUND

1. Field

The following description relates to an optical imaging system, more particularly, an optical imaging system implemented in a mobile telephoto camera.

2. Description of Related Art

There is an increased desire for high-magnification telephoto cameras that are implemented in mobile devices, and an increased desire for cameras that have a slim form factor. Since it is desirous that high-magnification telephoto cameras have a relatively long focal length, an overall length of the camera may increase. Accordingly, an overall length of the camera may be ensured by disposing a prism that converts a path of incident light on an object side of the plurality of lenses. Instead, in such a structure, there may be a limitation in increasing a diameter of a lens, it may be difficult to lower an F value.

SUMMARY

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

In a general aspect, an optical imaging system includes a first lens group comprising at least one lens disposed in a first optical axis direction; a second lens group comprising at least one lens disposed in a second optical axis direction perpendicular to the first optical axis direction; and a prism disposed between the first lens group and the second lens group, and configured to convert a path of incident light from the first optical axis direction to the second optical axis direction, wherein a conditional expression $0.200 \leq D1/OAL2 \leq 0.500$ is satisfied, where D1 is a maximum effective diameter of the first lens group, and OAL2 is a distance on a second optical axis from a reflective surface of the prism to an imaging plane.

The first lens group may include a first lens having positive refractive power; and a second lens having negative refractive power and a meniscus shape which is convex toward an object side.

The second lens group may include a third lens, a fourth lens, a fifth lens and a sixth lens disposed in order in the second optical axis direction, and the third lens and the fourth lens may have opposite refractive powers.

A conditional expression $0.500 \leq fLG1/f \leq 0.800$ may be satisfied, where fLG1 is a focal length of the first lens group, and f is a focal length of the optical imaging system.

A conditional expression $1.500 \leq OAL1/ImgH \leq 2.500$ may be satisfied, where OAL1 is a distance on the first optical axis direction from an object-side surface of a lens of the first lens group, disposed the most adjacent to an object, to a reflective surface of the prism, and ImgH is half a diagonal length of an image plane.

A conditional expression $0.500 \leq FOV/OAL2 \leq 0.600$ (unit: $^\circ\ mm^{-1}$) may be satisfied, where FOV is a field of view of the optical imaging system.

A conditional expression $0.400 < D2/OAL1 \leq 1.000$ may be satisfied, where D2 is a maximum effective diameter of the second lens group, and OAL1 is a distance on a first optical axis from an object-side surface of a lens of the first lens group, disposed the most adjacent to an object, to a reflective surface of the prism.

The second lens group may further include a seventh lens disposed on an image side of the sixth lens, and having negative refractive power.

In a general aspect, an optical imaging system includes a first lens, a second lens, a third lens, a fourth lens, a fifth lens and a sixth lens disposed in order from an object side toward an imaging plane; and a prism, disposed between the second lens and the third lens, and configured to convert a path of incident light from a first optical axis direction to a second optical axis direction, wherein the first lens and the second lens are disposed on an object side of the prism, and are included in a first lens group, and the third lens to the sixth lens are disposed on an image side of the prism, and are included in a second lens group, and wherein a conditional expression $0.400 < D2/OAL1 \leq 1.000$ is satisfied, where D2 is a maximum effective diameter of the second lens group, and OAL1 is a distance on a first optical axis from an object-side surface of the first lens to a reflective surface of the prism.

The third lens may have positive refractive power, a convex object-side surface, and a convex image-side surface.

The fourth lens may have negative refractive power, a concave object-side surface, and a convex image-side surface.

The second lens group may further include a seventh lens disposed on an image side of the sixth lens, and having negative refractive power.

The second lens may have negative refractive power and may have a meniscus shape which is convex toward an object side.

An object-side surface of the fifth lens may be concave.

The sixth lens may have negative refractive power.

A conditional expression $0.200 \leq OAL1/OAL2 \leq 0.300$ may be satisfied, where OAL2 is a distance on a second optical axis from a reflective surface of the prism to an image plane.

In a general aspect, an optical imaging system includes a first lens group comprising at least one lens disposed in a first optical axis direction; a second lens group comprising at least four lens disposed in a second optical axis direction perpendicular to the first optical axis direction; and a prism disposed between the first lens group and the second lens group, and configured to convert a path of incident light from the first optical axis direction to the second optical axis direction, wherein a conditional expression $0.400 < D2/OAL1 \leq 1.000$ is satisfied, where D2 is a maximum effective diameter of the second lens group, and OAL1 is a distance on a first optical axis from an object-side surface of the first lens to a reflective surface of the prism.

The first lens group comprises a first lens having a convex object-side surface, and a concave image-side surface.

The second lens group may have negative refractive power.

Other features and aspects will be apparent from the following detailed description, the drawings, and the claims.

Figure 1A:
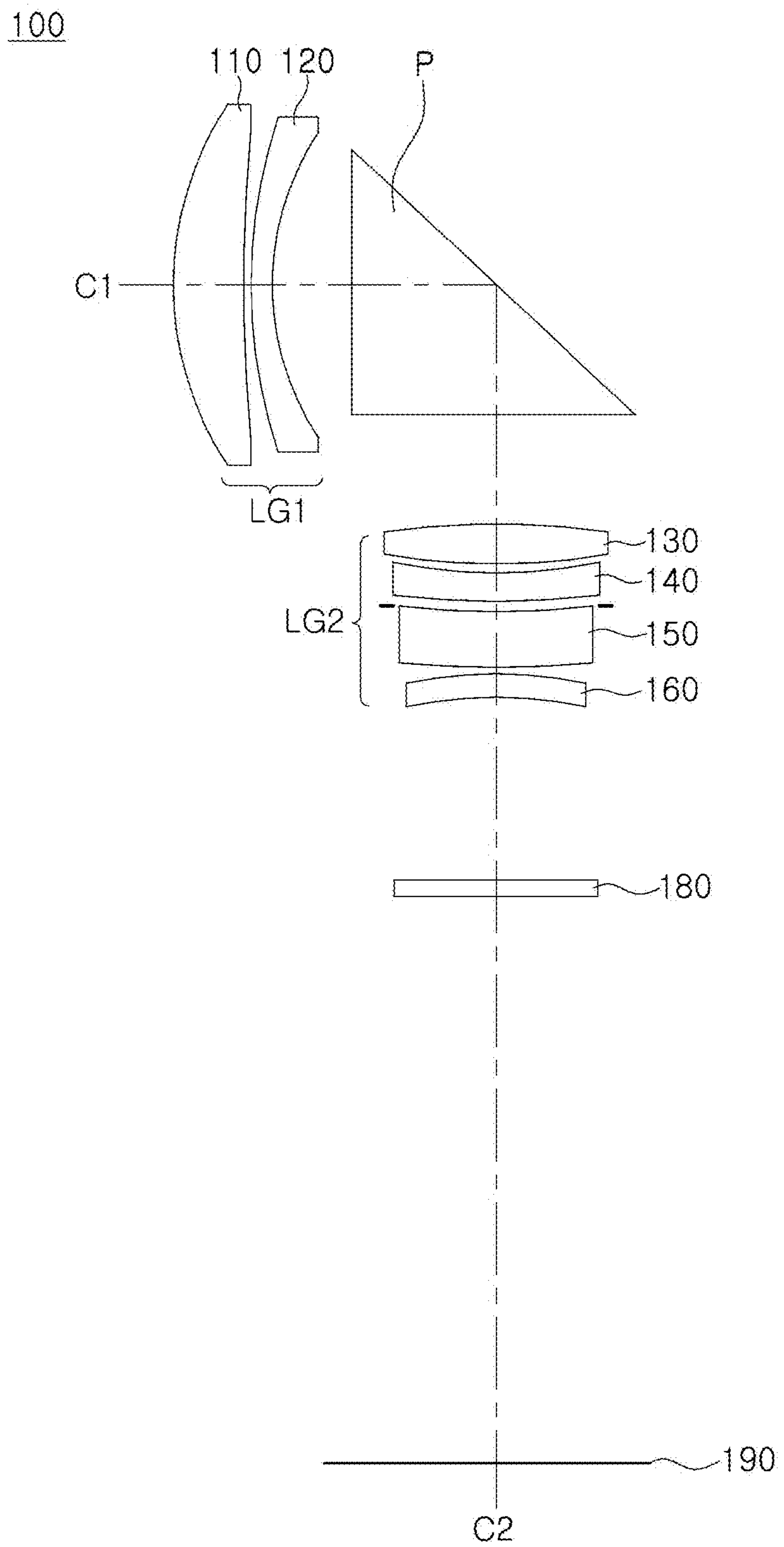
FIG. 1A is a configuration diagram illustrating an example optical imaging system in accordance with a first embodiment.

Throughout the drawings and the detailed description, unless otherwise described, the same reference numerals refer to the same elements. The drawings may not be to scale, and the relative size, proportions, and depiction of elements in the drawings may be exaggerated for clarity, illustration, and convenience.

DETAILED DESCRIPTION

The following detailed description is provided to assist the reader in gaining a comprehensive understanding of the methods, apparatuses, and/or systems described herein. However, various changes, modifications, and equivalents of the methods, apparatuses, and/or systems described herein will be apparent after an understanding of the disclosure of this application. For example, the sequences within and/or of operations described herein are merely examples, and are not limited to those set forth herein, but may be changed as will be apparent after an understanding of the disclosure of this application, except for sequences within and/or of operations necessarily occurring in a certain order. As another example, the sequences of and/or within operations may be performed in parallel, except for at least a portion of sequences of and/or within operations necessarily occurring in an order, e.g., a certain order. Also, descriptions of features that are known after an understanding of the disclosure of this application may be omitted for increased clarity and conciseness.

Although terms such as “first,” “second,” and “third”, or A, B, (a), (b), and the like may be used herein to describe various members, components, regions, layers, or sections, these members, components, regions, layers, or sections are not to be limited by these terms. Each of these terminologies is not used to define an essence, order, or sequence of corresponding members, components, regions, layers, or sections, for example, but used merely to distinguish the corresponding members, components, regions, layers, or sections from other members, components, regions, layers, or sections. Thus, a first member, component, region, layer, or section referred to in the examples described herein may also be referred to as a second member, component, region, layer, or section without departing from the teachings of the examples.

Throughout the specification, when a component or element is described as “on,” “connected to,” “coupled to,” or “joined to” another component, element, or layer, it may be directly (e.g., in contact with the other component, element, or layer) “on,” “connected to,” “coupled to,” or “joined to” the other component element, or layer, or there may reasonably be one or more other components elements, or layers intervening therebetween. When a component or element is described as “directly on”, “directly connected to,” “directly coupled to,” or “directly joined to” another component element, or layer, there can be no other components, elements, or layers intervening therebetween. Likewise, expressions, for example, “between” and “immediately between” and “adjacent to” and “immediately adjacent to” may also be construed as described in the foregoing.

The terminology used herein is for describing various examples only and is not to be used to limit the disclosure. The articles “a,” “an,” and “the” are intended to include the plural forms as well, unless the context clearly indicates otherwise. As non-limiting examples, terms “comprise” or “comprises,” “include” or “includes,” and “have” or “has” specify the presence of stated features, numbers, operations, members, elements, and/or combinations thereof, but do not preclude the presence or addition of one or more other features, numbers, operations, members, elements, and/or combinations thereof, or the alternate presence of an alternative stated features, numbers, operations, members, elements, and/or combinations thereof. Additionally, while one embodiment may set forth such terms "comprise" or "comprises," "include" or "includes," and "have" or "has" specify the presence of stated features, numbers, operations, members, elements, and/or combinations thereof, other embodiments may exist where one or more of the stated features, numbers, operations, members, elements, and/or combinations thereof are not present.

As used herein, the term "and/or" includes any one and any combination of any two or more of the associated listed items. The phrases "at least one of A, B, and C", "at least one of A, B, or C", and the like are intended to have disjunctive meanings, and these phrases "at least one of A, B, and C", "at least one of A, B, or C", and the like also include examples where there may be one or more of each of A, B, and/or C (e.g., any combination of one or more of each of A, B, and C), unless the corresponding description and embodiment necessitates such listings (e.g., "at least one of A, B, and C") to be interpreted to have a conjunctive meaning.

In the drawings, a thickness, size, and shape of a lens may be exaggerated for ease of description, and a spherical or aspherical shape of a lens is merely an example and is not limited thereto.

The features described herein may be embodied in different forms, and are not to be construed as being limited to the examples described herein. Rather, the examples described herein have been provided merely to illustrate some of the many possible ways of implementing the methods, apparatuses, and/or systems described herein that will be apparent after an understanding of the disclosure of this application. The use of the term "may" herein with respect to an example or embodiment (e.g., as to what an example or embodiment may include or implement) means that at least one example or embodiment exists where such a feature is included or implemented, while all examples are not limited thereto. The use of the terms "example" or "embodiment" herein have a same meaning (e.g., the phrasing "in one example" has a same meaning as "in one embodiment", and "one or more examples" has a same meaning as "in one or more embodiments").

One or more example may provide an optical imaging system having improved low-light imaging performance.

In the embodiments, a unit of values of radius of curvature, thickness, distance, focal length, ½ of a diagonal length of an image plane (IMG HT), and semi-aperture of a lens may be in millimeters (mm), and a unit of a field of view (FOV) may be in degrees. Additionally, a thickness of a lens and a distance between lenses may refer to a thickness and a distance on an optical axis.

In embodiments, an object side may indicate a direction in which an object is disposed, and an image side may indicate, for example, a direction in which an image plane on which an image is formed is disposed or a direction in which an image sensor is disposed.

In the description related to the shape of a lens of the embodiments, a convex surface may indicate that a paraxial region (a narrow region in vicinity of an optical axis) portion of a surface may be convex, and a concave surface may indicate that a paraxial region portion of the surface may be concave. Accordingly, even when one surface of the lens is described as having a convex shape, an edge portion of the lens may be concave. Similarly, although one surface of a lens is described as having a concave shape, an edge portion of the lens may be convex.

In an example, an optical imaging system according to the embodiments may be implemented in a telephoto camera module for a mobile device. As non-limited examples, a mobile device may be any type of portable electronic device, such as, but not limited to, a mobile communication terminal, smartphone, or tablet personal computer (PC).

According to the embodiments, an optical imaging system may include 6 or 7 lenses. For example, the optical imaging system may include a first lens, a second lens, a third lens, a fourth lens, a fifth lens, and a sixth lens disposed in order from an object side toward an imaging plane, and may further include a seventh lens. In an example, the seventh lens may be disposed at an imaging side of the sixth lens.

Additionally, according to the embodiments, an optical imaging system may include a plurality of lens groups. For example, an optical imaging system may include a first lens group and a second lens group disposed in order from an object side toward an imaging plane, and each of the plurality of lens groups may include at least one lens among the plurality of lenses.

The optical imaging system according to the embodiments may not only include a plurality of lenses or lens groups, but may further include an optical path conversion device configured to convert a path of incident light, an image sensor configured to convert incident light into an electrical signal, an infrared blocking filter configured to block light from an infrared region incident to the image sensor and an aperture configured to control the amount of light.

According to the embodiments, an optical path conversion device may be configured, as an example, as a prism, and the prism may be disposed between the first lens group and the second lens group. The prism may be tilt-driven with respect to two axes when shaking of a camera is compensated for (in the embodiments, the optical path conversion device may be configured as a prism. However, this is only an example, and other types of reflective members (e.g. a mirror) which may convert an optical path may be implemented instead of a prism). Additionally, the infrared blocking filter may be disposed between the sixth lens and the image sensor, and the aperture may be disposed in the second lens group. In the embodiments, in non-limited examples, the aperture may be disposed between the fourth and fifth lenses or between the fifth and sixth lenses.

Additionally, the optical imaging system according to the embodiments may further include a spacer disposed between the first lens group and the prism. In an example, the spacer may be disposed toward an incident surface of a prism. The spacer may include a light blocking portion formed along a circumference of the first lens group to reduce flare occurring when light passing through the first lens group is incident to the prism.

An optical imaging system according to the embodiments may include a plastic lens. In an example, at least a portion of the plurality of lenses may be formed of a plastic material, and preferably, the entirety of the plurality of lenses may be formed of a plastic material.

Additionally, the optical imaging system according to the embodiments may include an aspherical lens. For example, at least one of the plurality of lenses may be configured as an aspherical lens, and at least one of an object-side surface and an image-side surface of at least one of the plurality of lenses may be aspherical. The aspherical surface of the lens may be represented by Equation 1 below.

$$Z = \frac{cY^2}{1+\sqrt{1-(1+K)c^2Y^2}} + AY^4 + BY^6 + CY^8 + DY^{10} + EY^{12} + FY^{14} + GY^{16} + HY^{18} + JY^{20} + LY^{22} + MY^{24} + NY^{26} + OY^{28} + PY^{30} \quad \text{Equation 1:}$$

In Equation 1, c is a reciprocal of a radius of curvature of the lens, K is a conic constant, and Y is a distance from any point on the aspherical surface of the lens to the optical axis. Additionally, the constants A-H, J, and L-P are aspherical constants from the 4th to the 30th order, and Z (or SAG) is a distance in the optical axis direction between any point on the aspherical surface and an apex of the aspherical surface.

In the embodiments, the first lens group may be disposed on an object side of the prism and may include a first lens and a second lens. The first lens may be disposed in the first optical axis c1. The second lens group may be disposed on an image side of the prism and may include a third lens to a sixth lens or a third lens to a seventh lens. The third lens to the sixth lens, or the third lens to the seventh lens may be disposed in the second optical axis c2 direction.

The prism may be disposed between the first lens group and the second lens group and may convert a path of incident light from the first optical axis c1 direction to the second optical axis c2 direction. The first optical axis c1 direction and the second optical axis c2 direction may be almost perpendicular to each other.

The optical imaging system according to the embodiments may satisfy the conditional expressions below:

$$0.400 < D2/OAL1 \le 1.000 \quad \text{[Conditional expression 1]}$$

$$0.200 \le D1/OAL2 \le 0.500 \quad \text{[Conditional expression 2]}$$

$$0.500 \le fLG1/f \le 0.800 \quad \text{[Conditional expression 3]}$$

$$1.000 \le Fno*(fLG1/f) \le 4.000 \quad \text{[Conditional expression 4]}$$

$$0.500 \le |fLG2/f| < 1.300 \quad \text{[Conditional expression 5]}$$

$$0.500 \le |fLG1/fLG2| < 1.300 \quad \text{[Conditional expression 6]}$$

$$0.500 \le FOV/OAL2 \le 0.600 \text{ (unit:}^\circ\cdot\text{mm}-1) \quad \text{[Conditional expression 7]}$$

$$8.000 \le f/ImgH \le 12.000 \quad \text{[Conditional expression 8]}$$

$$1.500 \le OAL1/ImgH \le 2.500 \quad \text{[Conditional expression 9]}$$

In Conditional expression 1, D2 is the maximum effective diameter of the second lens group, and OAL1 is the distance from an object-side surface of the lens of the first lens group (or the first lens), disposed the most adjacent to an object, to the reflective surface of the prism. Conditional expression 1 may be related to the size (miniaturization) of a lens-leading optical system in which the lens is disposed on an object side of the prism.

In Conditional expression 2, D1 is the maximum effective diameter of the first lens group, and OAL2 is the distance on the second optical axis from the reflective surface of the prism to an image plane. Conditional expression 2 may be related to brightness performance of a lens-leading telephoto camera in which the lens is disposed on an object side of the prism.

In Conditional expression 3, fLG1 is the focal length of the first lens group, and f is the focal length of the optical imaging system. Conditional expression 3 may be related to the size (miniaturization) of the optical system. According to Conditional expression 3, as power of the first lens group (or as the focal length decreases) increases, a height of the second lens group may decrease.

In Conditional expression 4, Fno is the F value of the optical imaging system. Conditional expression 4 may be related to brightness performance of a telephoto camera.

In Conditional expression 5 and Conditional expression 6, fLG2 is the focal length of the second lens group. Conditional expression 5 and Conditional expression 6 may be related to a range of the focal length of the first lens group and the second lens group to form an appropriate focal length for a telephoto camera.

In Conditional expression 7, FOV is the field of view of an optical imaging system. Conditional expression 7 is related to the size (miniaturization) of the optical system, and when the optical imaging system has an appropriate field of view, miniaturization of the camera module may be easily implemented.

In Conditional expression 8, ImgH is half the diagonal length of the image plane. Conditional expression 8 is related to the range of the focal length of the telephoto camera, and Conditional expression 9 relates to a ratio of a thickness of a module to the diagonal length of an image plane and is a slim factor condition related to the size (miniaturization) of the optical system.

Additionally, the optical imaging system according to the embodiments may further satisfy the conditional expressions below:

$$0.950 \le dP1/ODL3 < 1.300 \quad \text{[Conditional expression 10]}$$

$$0.200 < (R3-R4)/(R3+R4) < 0.500 \quad \text{[Conditional expression 11]}$$

$$0.300 \le |R3/fLG2| < 1.200 \quad \text{[Conditional expression 12]}$$

$$0.500 \le fLG1/OAL \le 0.900 \quad \text{[Conditional expression 13]}$$

$$0.200 \le OAL1/OAL2 \le 0.300 \quad \text{[Conditional expression 14]}$$

In Conditional expression 10, dP1 is the distance on the first optical axis from an incident surface of the prism to the reflective surface of the prism, and ODL3 is half the outer diameter of the lens (or the third lens) disposed the most adjacent to an object side in the second lens group. Conditional expression 10 is related to the size of the prism with respect to the height of the second lens group. When the conditional expression is satisfied, the height of the second lens group may be low, miniaturization of the module may be easily implemented.

In Conditional expression 11, R3 and R4 are the radii of curvature of an object-side surface and an image-side surface of the second lens, respectively. Conditional expression 11 may be related to the shape condition of the second lens for the first lens group to have an appropriate focal length.

Conditional expression 12 may be related to the shape condition of the second lens to ensure that the second lens group forms an appropriate focal length.

Conditional expression 13 may be related to the range of the focal length of the first lens group to ensure that the optical system has an appropriate size.

Conditional expression 14 corresponds to a lens-leading optical system in which a lens is disposed on an object side of the prism. In the example in which the conditional expression is not satisfied, it may be difficult to manufacture the module to have an appropriate size (a length and a thickness).

Hereinafter, an optical imaging system according to the embodiments will be described with reference to the accompanied drawings.

First Embodiment

Figure 1B:
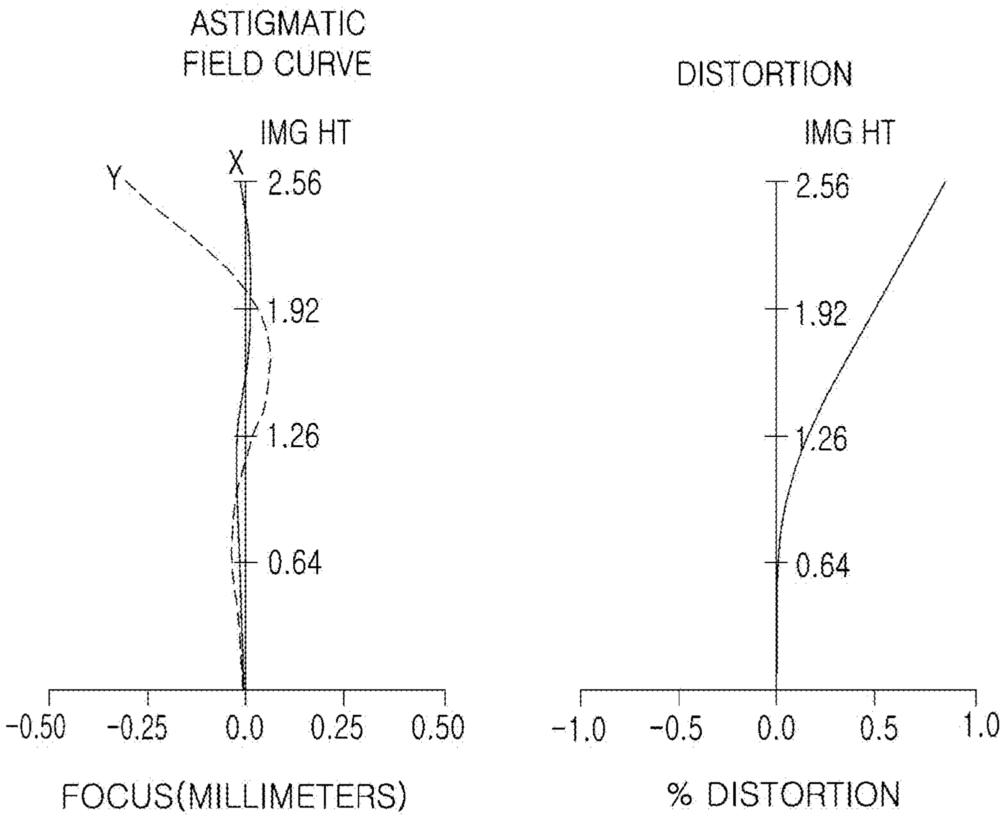
FIG. 1B is a diagram illustrating aberration properties of an example optical imaging system in accordance with the first embodiment.

FIG. 1A is a configuration diagram illustrating an example optical imaging 100 according to a first embodiment. FIG. 1B is a diagram illustrating aberration properties of the example optical imaging system 100 according to the first embodiment.

The optical imaging system 100 according to the first embodiment may include a first lens 110, a second lens 120, a third lens 130, a fourth lens 140, a fifth lens 150 and a sixth lens 160 disposed in order from an object side toward an imaging plane, and may further include an infrared blocking filter 180 and an image sensor 190 disposed on an image side of the sixth lens 160.

The first lens 110 may have positive refractive power. An object-side surface of the first lens 110 may be convex in a paraxial region, and an image-side surface of the first lens 110 may be concave in the paraxial region. The first lens 110 may be formed of a plastic material. The first lens 110 may be an aspherical lens. For example, an object-side surface and an image-side surface of the first lens 110 may be aspherical.

The second lens 120 may have negative refractive power. An object-side surface of the second lens 120 may be convex in a paraxial region, and an image-side surface of the second lens 120 may be concave in the paraxial region. The second lens 120 may be formed of a plastic material. Specifically, the second lens 120 may be formed of a plastic material having optical properties (e.g., a refractive index and an Abbe number) different from those of the first lens 110. The second lens 120 may be an aspherical lens. For example, an object-side surface and an image-side surface of the second lens 120 may be aspherical.

The third lens 130 may have positive refractive power. An object-side surface and an image-side surface of the third lens 130 may be convex in a paraxial region. The third lens 130 may be formed of a plastic material. Specifically, the third lens 130 may be formed of a plastic material having optical properties (e.g., a refractive index and an Abbe number) different from those of the second lens 120. The third lens 130 may be an aspherical lens. For example, an object-side surface and an image-side surface of the third lens 130 may be aspherical.

The fourth lens 140 may have negative refractive power. An object-side surface of the fourth lens 140 may be concave in a paraxial region, and an image-side surface of the fourth lens 140 may be convex in the paraxial region. The fourth lens 140 may be formed of a plastic material. Specifically, the fourth lens 140 may be formed of a plastic material having optical properties (e.g., a refractive index and an Abbe number) different from those of the third lens 130. The fourth lens 140 may be an aspherical lens. For example, an object-side surface and an image-side surface of the fourth lens 140 may be aspherical.

The fifth lens 150 may have negative refractive power. An object-side surface of the fifth lens 150 may be concave in a paraxial region, and an image-side surface of the fifth lens 150 may be convex in the paraxial region. The fifth lens 150 may be formed of a plastic material. Specifically, the fifth lens 150 may be formed of a plastic material having optical properties (e.g., a refractive index and an Abbe number) different from those of the fourth lens 140. The fifth lens 150 may be an aspherical lens. For example, an object-side surface and an image-side surface of the fifth lens 150 may be aspherical.

The sixth lens 160 may have negative refractive power. An object-side surface of the sixth lens 160 may be convex in a paraxial region, and an image-side surface of the sixth lens 160 may be concave in the paraxial region. The sixth lens 160 may be formed of a plastic material. Specifically, the sixth lens 160 may be formed of a plastic material having optical properties (e.g., different refractive index and Abbe number) different from those of the fifth lens 150. The sixth lens 160 may be an aspherical lens. For example, an object-side surface and an image-side surface of the sixth lens 160 may be aspherical.

In an example, a prism P may be disposed between the second lens 120 and the third lens 130. The first lens 110 and the second lens 120 may be disposed on an object side with respect to the prism P, and may be included in the first lens group LG1, and the third lens to the sixth lens 130-160 may be disposed on an image side with respect to the prism P, and may be included in the second lens group LG2. The first lens group LG1 may have positive refractive power, and the second lens group LG2 may have negative refractive power.

Table 1 below lists optical and physical parameters of the example optical imaging system 100 according to the first embodiment.

TABLE 1

| Surface | Radius | Thickness/ Distance | Index | Abbe number | Semi- Aperture |
|---|---|---|---|---|---|
| Object | Infinity | Infinity | | | |
| 1 | Infinity | 0.000 | | | |
| 2 | 5.230 | 1.200 | 1.544 | 56.0 | 3.00 |
| 3 | 79.012 | 0.075 | | | 2.93 |
| 4 | 8.902 | 0.350 | 1.614 | 25.9 | 2.77 |
| 5 | 4.988 | 1.385 | | | 2.54 |
| 6 | Infinity | 2.250 | 1.834 | 37.3 | 2.10 |
| 7 | Infinity | 2.250 | 1.834 | 37.3 | 3.30 |
| 8 | Infinity | 2.250 | | | 1.76 |
| 9 | 18.779 | 0.616 | 1.660 | 20.4 | 1.73 |
| 10 | −9.741 | 0.125 | | | 1.67 |
| 11 | −5.788 | 0.400 | 1.639 | 23.5 | 1.63 |
| 12 | −25.155 | 0.221 | | | 1.54 |
| 13 | −11.715 | 0.900 | 1.614 | 25.9 | 1.52 |
| 14 | −231.689 | 0.176 | | | 1.46 |
| 15 | 12.052 | 0.400 | 1.544 | 56.0 | 1.43 |
| 16 | 10.645 | 3.000 | | | 1.38 |
| 17 | Infinity | 0.210 | 1.518 | 64.2 | 1.62 |
| 18 | Infinity | 9.470 | | | 1.63 |
| Image | Infinity | | | | 2.57 |

Table 2 below lists aspherical data of the example optical imaging system 100 according to the first embodiment.

TABLE 2

| Surface | 2 | 3 | 4 | 5 | 9 | 10 |
|---|---|---|---|---|---|---|
| K | 2.78E−01 | 8.19E+00 | −6.56E−01 | 5.29E−01 | −2.70E+01 | −2.92E+00 |
| A | −6.88E−04 | 7.47E−05 | −1.35E−03 | −2.42E−03 | −3.65E−04 | −1.18E−02 |

TABLE 2-continued

| | | | | | | |
|---|---|---|---|---|---|---|
| B | 7.11E−04 | 4.44E−04 | −2.14E−04 | 6.30E−04 | 1.68E−03 | 1.35E−02 |
| C | −2.72E−04 | −1.48E−04 | 1.67E−04 | −3.38E−04 | −9.04E−04 | −7.64E−03 |
| D | 5.76E−05 | 2.02E−05 | −3.54E−05 | 1.32E−04 | −4.39E−04 | 8.92E−04 |
| E | −7.33E−06 | −9.64E−07 | 5.29E−06 | −2.34E−05 | 5.89E−04 | 1.10E−03 |
| F | 5.19E−07 | −2.20E−08 | −4.84E−07 | 1.94E−06 | −2.03E−04 | −5.01E−04 |
| G | −1.60E−08 | 1.73E−09 | 1.82E−08 | −6.14E−08 | 2.47E−05 | 6.67E−05 |
| H | 0.00E+00 | 0.00E+00 | 0.00E+00 | 0.00E+00 | 0.00E+00 | 0.00E+00 |
| J | 0.00E+00 | 0.00E+00 | 0.00E+00 | 0.00E+00 | 0.00E+00 | 0.00E+00 |
| L | 0.00E+00 | 0.00E+00 | 0.00E+00 | 0.00E+00 | 0.00E+00 | 0.00E+00 |
| M | 0.00E+00 | 0.00E+00 | 0.00E+00 | 0.00E+00 | 0.00E+00 | 0.00E+00 |
| N | 0.00E+00 | 0.00E+00 | 0.00E+00 | 0.00E+00 | 0.00E+00 | 0.00E+00 |
| O | 0.00E+00 | 0.00E+00 | 0.00E+00 | 0.00E+00 | 0.00E+00 | 0.00E+00 |
| P | 0.00E+00 | 0.00E+00 | 0.00E+00 | 0.00E+00 | 0.00E+00 | 0.00E+00 |

| Surface | 11 | 12 | 13 | 14 | 15 | 16 |
|---|---|---|---|---|---|---|
| K | −1.06E−01 | −2.62E+00 | 1.37E+00 | 9.90E+01 | 1.63E+00 | −1.88E+01 |
| A | 2.93E−04 | −4.34E−04 | −1.56E−02 | −1.65E−04 | 7.98E−03 | 8.22E−03 |
| B | 1.38E−02 | 3.25E−02 | 5.00E−02 | 3.81E−03 | −4.06E−02 | −3.57E−02 |
| C | −5.55E−03 | −4.98E−02 | −9.26E−02 | −1.38E−02 | 8.23E−02 | 8.07E−02 |
| D | −2.58E−03 | 4.24E−02 | 9.07E−02 | 1.72E−02 | −9.08E−02 | −9.99E−02 |
| E | 3.11E−03 | −2.00E−02 | −4.75E−02 | −9.75E−03 | 5.75E−02 | 7.14E−02 |
| F | −1.02E−03 | 4.91E−03 | 1.26E−02 | 2.62E−03 | −2.04E−02 | −2.93E−02 |
| G | 1.15E−04 | −4.86E−04 | −1.34E−03 | −2.72E−04 | 3.64E−03 | 6.41E−03 |
| H | 0.00E+00 | 0.00E+00 | 0.00E+00 | 0.00E+00 | −2.43E−04 | −5.76E−04 |
| J | 0.00E+00 | 0.00E+00 | 0.00E+00 | 0.00E+00 | 0.00E+00 | 0.00E+00 |
| L | 0.00E+00 | 0.00E+00 | 0.00E+00 | 0.00E+00 | 0.00E+00 | 0.00E+00 |
| M | 0.00E+00 | 0.00E+00 | 0.00E+00 | 0.00E+00 | 0.00E+00 | 0.00E+00 |
| N | 0.00E+00 | 0.00E+00 | 0.00E+00 | 0.00E+00 | 0.00E+00 | 0.00E+00 |
| O | 0.00E+00 | 0.00E+00 | 0.00E+00 | 0.00E+00 | 0.00E+00 | 0.00E+00 |
| P | 0.00E+00 | 0.00E+00 | 0.00E+00 | 0.00E+00 | 0.00E+00 | 0.00E+00 |

Second Embodiment

Figure 2A:
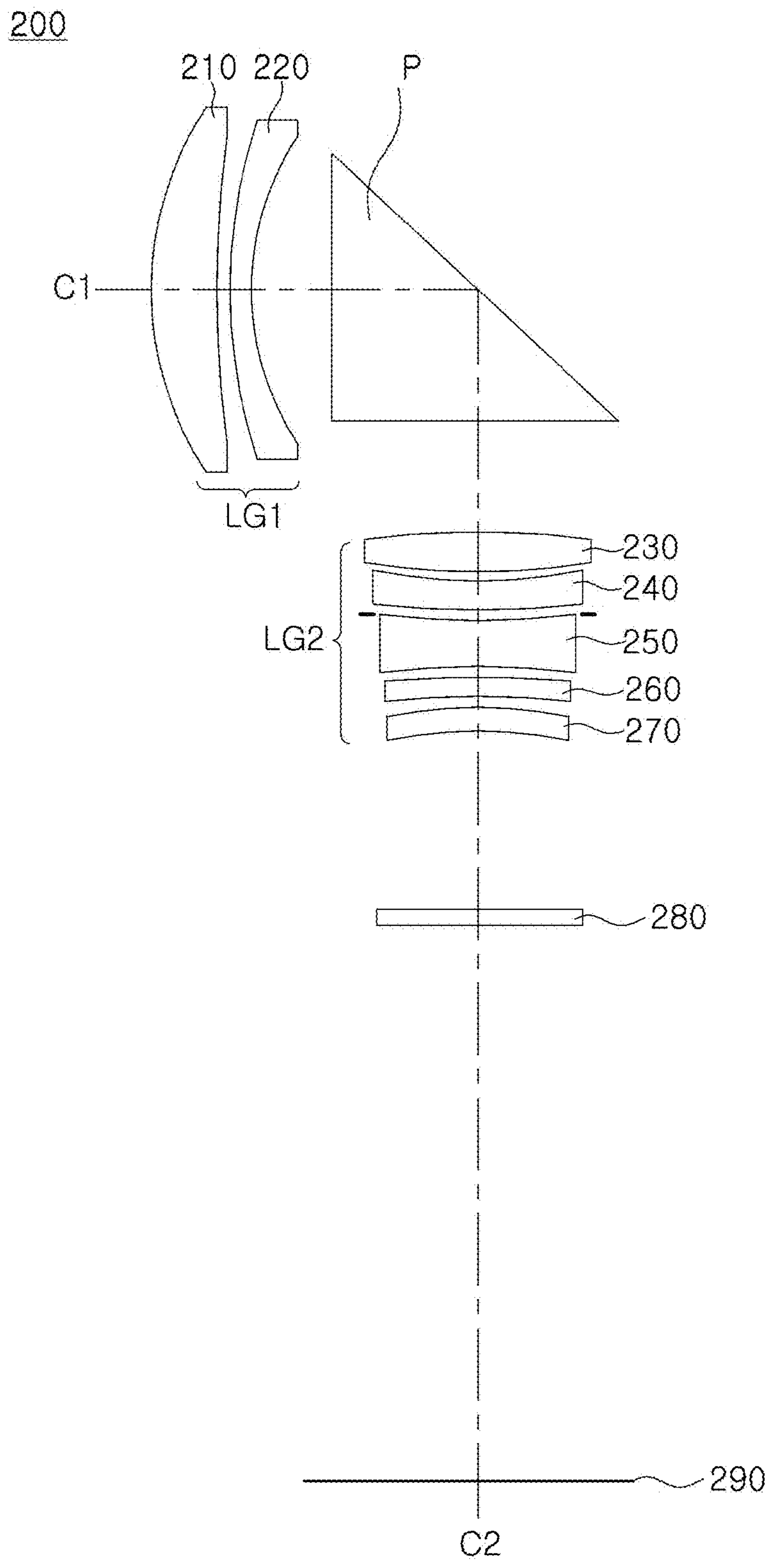
FIG. 2A is a configuration diagram illustrating an example optical imaging system in accordance with a second embodiment.
Figure 2B:
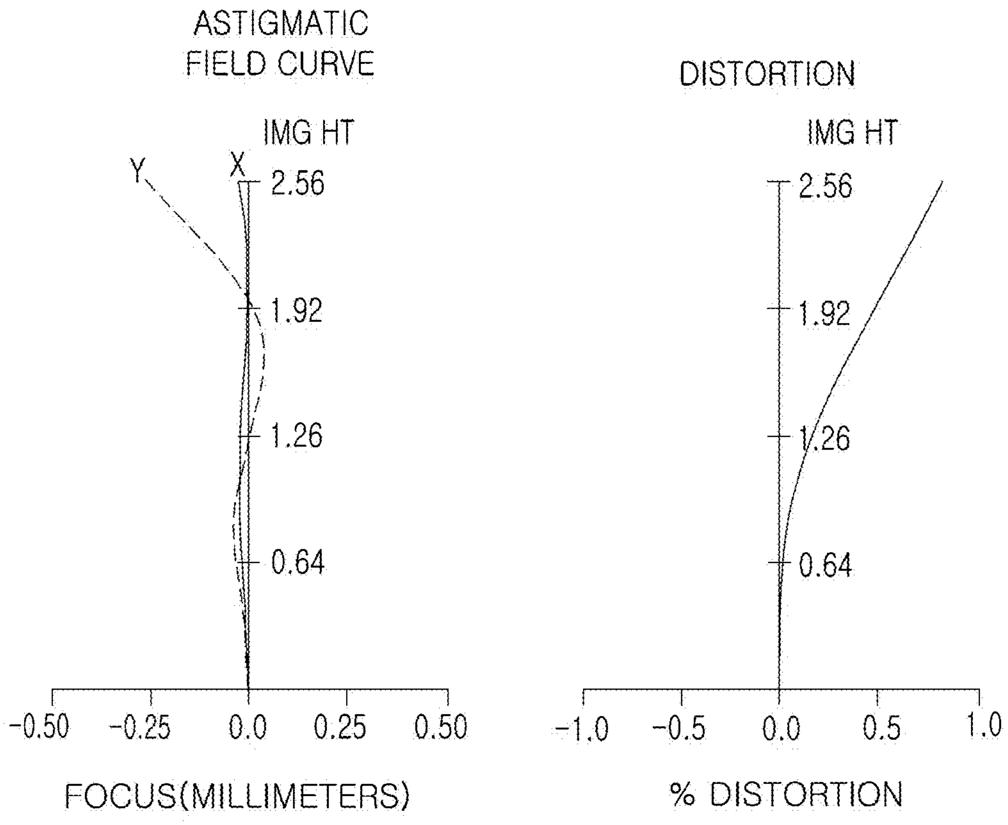
FIG. 2B is a graph indicating aberration properties of an example optical imaging system in accordance with the second embodiment.

FIG. 2A is a configuration diagram illustrating an example optical imaging system 200 according to a second embodiment. FIG. 2B is a graph illustrating aberration properties of the example optical imaging system 200 according to the second embodiment.

The optical imaging system 200 according to the second embodiment may include a first lens 210, a second lens 220, a third lens 230, a fourth lens 240, a fifth lens 250, a sixth lens 260 and a seventh lens 270 disposed in order from an object side toward an imaging plane, and may further include an infrared blocking filter 280 and an image sensor 290 disposed on an image side of the seventh lens 270.

The first lens 210 may have positive refractive power. An object-side surface of the first lens 210 may be convex in a paraxial region, and an image-side surface of the first lens 210 may be concave in the paraxial region. The first lens 210 may be formed of a plastic material. The first lens 210 may be an aspherical lens. For example, an object-side surface and an image-side surface of the first lens 210 may be aspherical.

The second lens 220 may have negative refractive power. An object-side surface of the second lens 220 may be convex in the paraxial region, and an image-side surface of the second lens 220 may be concave in the paraxial region. The second lens 220 may be formed of a plastic material. Specifically, the second lens 120 may be formed of a plastic material having optical properties (e.g., a refractive index and an Abbe number) different from those of the first lens 210. The second lens 220 may be an aspherical lens. For example, an object-side surface and an image-side surface of the second lens 220 may be aspherical.

The third lens 230 may have positive refractive power. An object-side surface and an image-side surface of the third lens 230 may be convex in the paraxial region. The third lens 230 may be formed of a plastic material. Specifically, the third lens 230 may be formed of a plastic material having optical properties (e.g., a refractive index and an Abbe number) different from those of the second lens 220. The third lens 230 may be an aspherical lens. For example, an object-side surface and an image-side surface of the third lens 230 may be aspherical.

The fourth lens 240 may have negative refractive power. An object-side surface of the fourth lens 240 may be concave in the paraxial region, and an image-side surface of the fourth lens 240 may be convex in the paraxial region. The fourth lens 240 may be formed of a plastic material. Specifically, the fourth lens 240 may be formed of a plastic material having optical properties (e.g., a refractive index and an Abbe number) different from those of the third lens 230. The fourth lens 240 may be an aspherical lens. For example, an object-side surface and an image-side surface of the fourth lens 240 may be aspherical.

The fifth lens 250 may have negative refractive power. An object-side surface and an image-side surface of the fifth lens 250 may be concave in the paraxial region. The fifth lens 250 may be formed of a plastic material. Specifically, the fifth lens 250 may be formed of a plastic material having optical properties (e.g., a refractive index and an Abbe number) different from those of the fourth lens 240. The fifth lens 250 may be an aspherical lens. For example, an object-side surface and an image-side surface of the fifth lens 250 may be aspherical.

The sixth lens 260 may have positive refractive power. An object-side surface of the sixth lens 260 may be convex in the paraxial region, and an image-side surface of the sixth lens 260 may be concave in the paraxial region. The sixth lens 260 may be formed of a plastic material. Specifically, the sixth lens 260 may be formed of a plastic material having optical properties (e.g., a refractive index and an Abbe number) different from those of the fifth lens 250. The sixth lens 260 may be an aspherical lens. For example, an object-side surface and an image-side surface of the sixth lens 260 may be aspherical.

The seventh lens 270 may have negative refractive power. An object-side surface of the seventh lens 270 may be convex in the paraxial region, and an image-side surface of the seventh lens 270 may be concave in the paraxial region. The seventh lens 270 may be formed of a plastic material. Specifically, the seventh lens 270 may be formed of a plastic material having optical properties (e.g., a refractive index and an Abbe number) different from those of the sixth lens 260. The seventh lens 270 may be an aspherical lens. For example, an object-side surface and an image-side surface of seventh lens 270 may be aspherical.

A prism P may be disposed between the second lens 220 and the third lens 230. The first lens 210 and the second lens 220 may be disposed on an object side with respect to the prism P, and may be included in the first lens group LG1, and the third lens to the seventh lens 230-270 may be disposed on an image side with respect to the prism P, and may be included in the second lens group LG2. The first lens group LG1 may have positive refractive power, and the second lens group LG2 may have negative refractive power.

Table 3 below lists optical and physical parameters of the example optical imaging system 200 according to the second embodiment.

TABLE 3

| Surface | Radius | Thickness/ Distance | Index | Abbe number | Semi-Aperture |
|---|---|---|---|---|---|
| Object | Infinity | Infinity | | | |
| 1 | Infinity | 0.000 | | | |
| 2 | 5.268 | 1.200 | 1.544 | 56.0 | 3.00 |
| 3 | 61.731 | 0.075 | | | 2.93 |
| 4 | 8.735 | 0.350 | 1.635 | 24.0 | 2.78 |
| 5 | 5.139 | 1.385 | | | 2.57 |
| 6 | Infinity | 2.250 | 1.834 | 37.3 | 2.10 |
| 7 | Infinity | 2.250 | 1.834 | 37.3 | 3.30 |
| 8 | Infinity | 2.255 | | | 1.76 |
| 9 | 19.092 | 0.657 | 1.660 | 20.4 | 1.76 |
| 10 | −8.720 | 0.193 | | | 1.69 |
| 11 | −5.387 | 0.400 | 1.639 | 23.5 | 1.63 |
| 12 | −19.893 | 0.208 | | | 1.54 |
| 13 | −11.402 | 0.778 | 1.614 | 25.9 | 1.52 |
| 14 | 79.518 | 0.100 | | | 1.47 |
| 15 | 22.877 | 0.400 | 1.660 | 20.4 | 1.46 |
| 16 | 26.962 | 0.100 | | | 1.43 |
| 17 | 11.821 | 0.400 | 1.544 | 56.0 | 1.42 |
| 18 | 9.808 | 3.000 | | | 1.38 |
| 19 | Infinity | 0.210 | 1.618 | 64.2 | 1.63 |
| 20 | Infinity | 8.948 | | | 1.65 |
| Image | Infinity | | | | 2.56 |

Table 4 below lists aspherical data of the example optical imaging system 200 according to the second embodiment.

TABLE 4

| Surface | 2 | 3 | 4 | 5 | 9 | 10 | 11 |
|---|---|---|---|---|---|---|---|
| K | 2.76E−01 | 1.98E+01 | −6.30E−01 | 5.26E−01 | −2.74E+01 | −2.88E+00 | −8.81E−02 |
| A | −6.94E−04 | 7.79E−05 | −1.35E−03 | −2.42E−03 | −3.60E−04 | −1.18E−02 | 2.78E−04 |
| B | 7.12E−04 | 4.44E−04 | −2.13E−04 | 6.28E−04 | 1.70E−03 | 1.35E−02 | 1.38E−02 |
| C | −2.72E−04 | −1.48E−04 | 1.67E−04 | −3.38E−04 | −9.01E−04 | −7.64E−03 | −5.55E−03 |
| D | 5.76E−05 | 2.02E−05 | −3.53E−05 | 1.32E−04 | −4.38E−04 | 8.93E−04 | −2.59E−03 |
| E | −7.33E−06 | −9.64E−07 | 5.30E−06 | −2.34E−05 | 5.89E−04 | 1.10E−03 | 3.11E−03 |
| F | 5.19E−07 | −2.20E−08 | −4.86E−07 | 1.94E−06 | −2.03E−04 | −5.01E−04 | −1.02E−03 |
| G | −1.60E−08 | 1.73E−09 | 1.82E−08 | −6.13E−08 | 2.47E−05 | 6.67E−05 | 1.15E−04 |
| H | 0.00E+00 | 0.00E+00 | 0.00E+00 | 0.00E+00 | 0.00E+00 | 0.00E+00 | 0.00E+00 |
| J | 0.00E+00 | 0.00E+00 | 0.00E+00 | 0.00E+00 | 0.00E+00 | 0.00E+00 | 0.00E+00 |
| L | 0.00E+00 | 0.00E+00 | 0.00E+00 | 0.00E+00 | 0.00E+00 | 0.00E+00 | 0.00E+00 |
| M | 0.00E+00 | 0.00E+00 | 0.00E+00 | 0.00E+00 | 0.00E+00 | 0.00E+00 | 0.00E+00 |
| N | 0.00E+00 | 0.00E+00 | 0.00E+00 | 0.00E+00 | 0.00E+00 | 0.00E+00 | 0.00E+00 |
| O | 0.00E+00 | 0.00E+00 | 0.00E+00 | 0.00E+00 | 0.00E+00 | 0.00E+00 | 0.00E+00 |
| P | 0.00E+00 | 0.00E+00 | 0.00E+00 | 0.00E+00 | 0.00E+00 | 0.00E+00 | 0.00E+00 |

| Surface | 12 | 13 | 14 | 15 | 16 | 17 | 18 |
|---|---|---|---|---|---|---|---|
| K | −5.93E+00 | 1.86E+00 | 9.15E+01 | 0.00E+00 | 0.00E+00 | 5.05E−01 | −1.76E+01 |
| A | −4.12E−04 | −1.56E−02 | −1.50E−04 | 0.00E+00 | 0.00E+00 | 7.90E−03 | 8.25E−03 |
| B | 3.25E−02 | 5.00E−02 | 3.77E−03 | 0.00E+00 | 0.00E+00 | −4.06E−02 | −3.57E−02 |
| C | −4.98E−02 | −9.26E−02 | −1.39E−02 | 0.00E+00 | 0.00E+00 | 8.23E−02 | 8.07E−02 |
| D | 4.24E−02 | 9.07E−02 | 1.72E−02 | 0.00E+00 | 0.00E+00 | −9.08E−02 | −9.99E−02 |
| E | −2.00E−02 | −4.75E−02 | −9.75E−03 | 0.00E+00 | 0.00E+00 | 5.75E−02 | 7.14E−02 |
| F | 4.91E−03 | 1.26E−02 | 2.62E−03 | 0.00E+00 | 0.00E+00 | −2.04E−02 | −2.93E−02 |
| G | −4.86E−04 | −1.34E−03 | −2.72E−04 | 0.00E+00 | 0.00E+00 | 3.64E−03 | 6.41E−03 |
| H | 0.00E+00 | 0.00E+00 | 0.00E+00 | 0.00E+00 | 0.00E+00 | −2.43E−04 | −5.76E−04 |
| J | 0.00E+00 | 0.00E+00 | 0.00E+00 | 0.00E+00 | 0.00E+00 | 0.00E+00 | 0.00E+00 |
| L | 0.00E+00 | 0.00E+00 | 0.00E+00 | 0.00E+00 | 0.00E+00 | 0.00E+00 | 0.00E+00 |
| M | 0.00E+00 | 0.00E+00 | 0.00E+00 | 0.00E+00 | 0.00E+00 | 0.00E+00 | 0.00E+00 |
| N | 0.00E+00 | 0.00E+00 | 0.00E+00 | 0.00E+00 | 0.00E+00 | 0.00E+00 | 0.00E+00 |
| O | 0.00E+00 | 0.00E+00 | 0.00E+00 | 0.00E+00 | 0.00E+00 | 0.00E+00 | 0.00E+00 |
| P | 0.00E+00 | 0.00E+00 | 0.00E+00 | 0.00E+00 | 0.00E+00 | 0.00E+00 | 0.00E+00 |

Third Embodiment

Figure 3A:
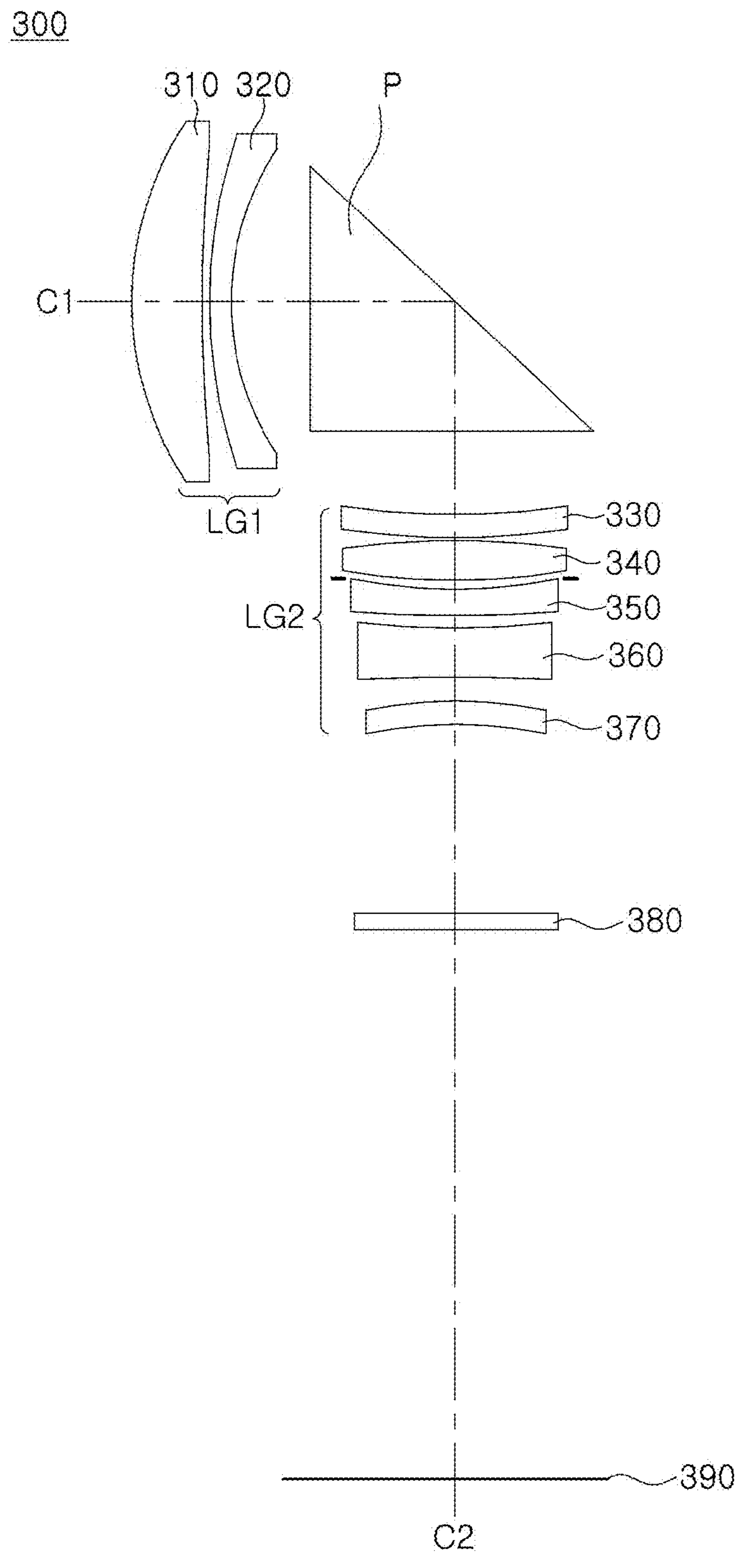
FIG. 3A is a configuration diagram illustrating an example optical imaging system in accordance with a third embodiment.
Figure 3B:
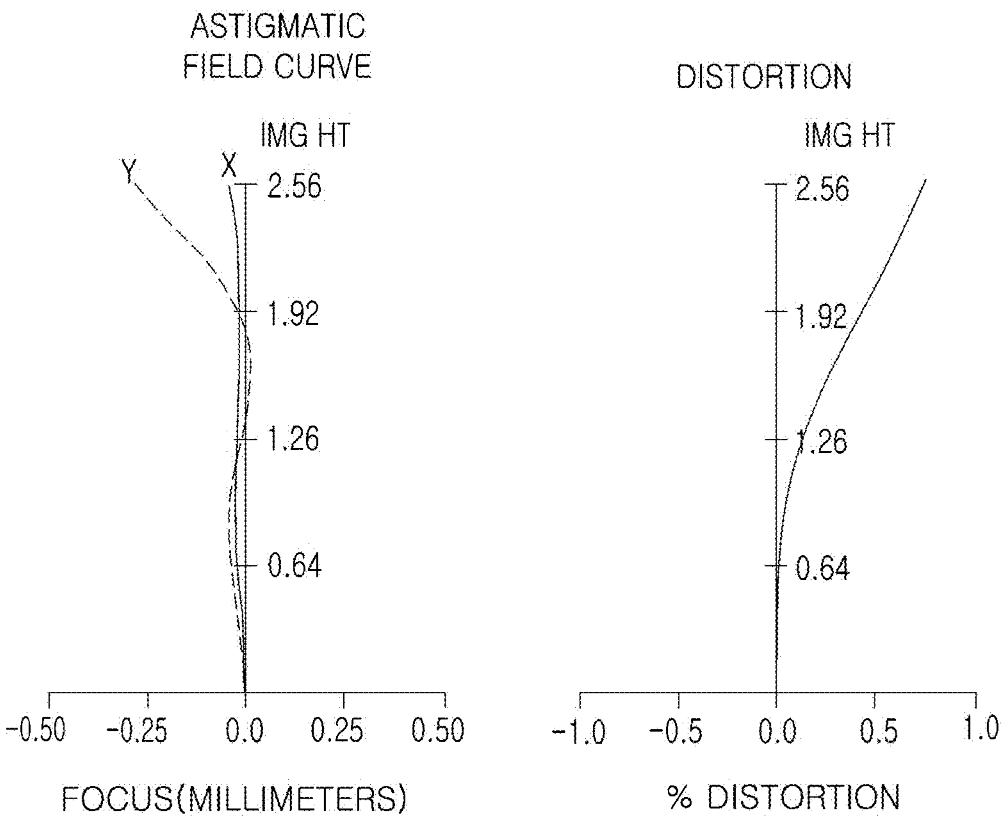
FIG. 3B is a graph indicating aberration properties of an example optical imaging system in accordance with the third embodiment.

FIG. 3A is a configuration diagram illustrating an example optical imaging system 300 according to a third embodiment. FIG. 3B is a graph illustrating aberration properties of the example optical imaging system 300 according to the third embodiment.

The optical imaging system 300 according to the third embodiment may include a first lens 310, a second lens 320, a third lens 330, a fourth lens 340, a fifth lens 350, a sixth lens 360 and a seventh lens 370 disposed in order from an object side toward an imaging plane, and may further include an infrared blocking filter 380 and an image sensor 390 disposed on an image side of the seventh lens 370.

The first lens 310 may have positive refractive power. An object-side surface of the first lens 310 may be convex in a paraxial region, and an image-side surface of the first lens 310 may be concave in the paraxial region. The first lens 310 may be formed of a plastic material. The first lens 310 may be an aspherical lens. For example, an object-side surface and an image-side surface of the first lens 310 may be aspherical.

The second lens 320 may have negative refractive power. An object-side surface of the second lens 320 may be convex in a paraxial region, and an image-side surface of the second lens 320 may be concave in the paraxial region. The second lens 320 may be formed of a plastic material. Specifically, the second lens 320 may be formed of a plastic material having optical properties (e.g., a refractive index and an Abbe number) different from those of the first lens 310. The second lens 320 may be an aspherical lens. For example, an object-side surface and an image-side surface of the second lens 320 may be aspherical.

The third lens 330 may have negative refractive power. An object-side surface of the third lens 330 may be concave in a paraxial region, and an image-side surface of the third lens 330 may be convex in the paraxial region. The third lens 330 may be formed of a plastic material. Specifically, the third lens 330 may be formed of a plastic material having optical properties (e.g., a refractive index and an Abbe number) different from those of the second lens 320. The third lens 330 may be an aspherical lens. For example, an object-side surface and an image-side surface of the third lens 330 may be aspherical.

The fourth lens 340 may have positive refractive power. An object-side surface and an image-side surface of the fourth lens 340 may be convex in a paraxial region. The fourth lens 340 may be formed of a plastic material. Specifically, the fourth lens 340 may be formed of a plastic material having optical properties (e.g., a refractive index and an Abbe number) different from those of the third lens 330. The fourth lens 340 may be an aspherical lens. For example, an object-side surface and an image-side surface of the fourth lens 340 may be aspherical.

The fifth lens 350 may have negative refractive power. An object-side surface of the fifth lens 350 may be concave in a paraxial region, and an image-side surface of the fifth lens 350 may be convex in the paraxial region. The fifth lens 350 may be formed of a plastic material. Specifically, the fifth lens 350 may be formed of a plastic material having optical properties (e.g., a refractive index and an Abbe number) different from those of the fourth lens 340. The fifth lens 350 may be an aspherical lens. For example, an object-side surface and an image-side surface of the fifth lens 350 may be aspherical.

The sixth lens 360 may have negative refractive power. An object-side surface and an image-side surface of the sixth lens 360 may be concave in a paraxial region. The sixth lens 360 may be formed of a plastic material. Specifically, the sixth lens 360 may be formed of a plastic material having optical properties (e.g., a refractive index and an Abbe number) different from those of the fifth lens 350. The sixth lens 360 may be an aspherical lens. For example, an object-side surface and an image-side surface of the sixth lens 360 may be aspherical.

The seventh lens 370 may have negative refractive power. An object-side surface of the seventh lens 370 may be convex in a paraxial region, and an image-side surface of the seventh lens 370 may be concave in the paraxial region. The seventh lens 370 may be formed of a plastic material. Specifically, the seventh lens 370 may be formed of a plastic material having optical properties (e.g., a refractive index and an Abbe number) different from those of the sixth lens 360. The seventh lens 370 may be an aspherical lens. For example, an object-side surface and an image-side surface of seventh lens 370 may be aspherical.

In an example, a prism P may be disposed between the second lens 320 and the third lens 330. The first lens 310 and the second lens 320 may be disposed on an object side with respect to the prism P, and may be included in the first lens group LG1, and the third lens to the seventh lens 330-370 may be disposed on an image side with respect to the prism P, and may be included in the second lens group LG2. The first lens group LG1 may have positive refractive power, and the second lens group LG2 may have negative refractive power.

Table 5 below lists optical and physical parameters of the example optical imaging system 300 according to the third embodiment.

TABLE 5

| Surface | Radius | Thickness/ Distance | Index | Abbe number | Semi- Aperture |
|---|---|---|---|---|---|
| Object | Infinity | Infinity | | | |
| 1 | Infinity | 0.000 | | | |
| 2 | 5.289 | 1.200 | 1.544 | 56.0 | 3.00 |
| 3 | 58.294 | 0.075 | | | 2.93 |
| 4 | 8.564 | 0.350 | 1.639 | 23.5 | 2.78 |
| 5 | 5.253 | 1.385 | | | 2.57 |
| 6 | Infinity | 2.250 | 1.834 | 37.3 | 2.10 |
| 7 | Infinity | 2.250 | 1.834 | 37.3 | 3.30 |
| 8 | Infinity | 2.268 | | | 1.76 |
| 9 | −12.723 | 0.400 | 1.671 | 19.2 | 1.83 |
| 10 | −13.020 | 0.110 | | | 1.81 |
| 11 | 21.351 | 0.677 | 1.660 | 20.4 | 1.76 |
| 12 | −7.915 | 0.185 | | | 1.69 |
| 13 | −5.063 | 0.400 | 1.639 | 23.5 | 1.62 |
| 14 | −16.137 | 0.203 | | | 1.53 |
| 15 | −10.443 | 0.824 | 1.614 | 25.9 | 1.51 |
| 16 | 104.007 | 0.307 | | | 1.45 |
| 17 | 10.888 | 0.400 | 1.544 | 56.0 | 1.42 |
| 18 | 9.279 | 3.000 | | | 1.38 |
| 19 | Infinity | 0.210 | 1.518 | 64.2 | 1.63 |
| 20 | Infinity | 9.026 | | | 1.64 |
| Image | Infinity | | | | 2.56 |

Table 6 below lists aspherical data of the optical imaging system 300 according to the third embodiment of the present disclosure.

TABLE 6

| Surface | 2 | 3 | 4 | 5 | 9 | 10 | 11 |
|---|---|---|---|---|---|---|---|
| K | 2.74E−01 | 1.00E+01 | −6.13E−01 | 5.25E−01 | 0.00E+00 | 0.00E+00 | −2.58E+01 |
| A | −6.98E−04 | 7.93E−05 | −1.35E−03 | −2.43E−03 | 0.00E+00 | 0.00E+00 | −3.47E−04 |
| B | 7.12E−04 | 4.44E−04 | −2.12E−04 | 6.28E−04 | 0.00E+00 | 0.00E+00 | 1.70E−03 |
| C | −2.72E−04 | −1.48E−04 | 1.68E−04 | −3.38E−04 | 0.00E+00 | 0.00E+00 | −9.01E−04 |
| D | 5.76E−05 | 2.02E−05 | −3.53E−05 | 1.32E−04 | 0.00E+00 | 0.00E+00 | −4.39E−04 |
| E | −7.33E−06 | −9.65E−07 | 5.30E−06 | −2.34E−05 | 0.00E+00 | 0.00E+00 | 5.89E−04 |
| F | 5.19E−07 | −2.20E−08 | −4.84E−07 | 1.94E−06 | 0.00E+00 | 0.00E+00 | −2.03E−04 |
| G | −1.60E−08 | 1.73E−09 | 1.82E−08 | −6.12E−08 | 0.00E+00 | 0.00E+00 | 2.47E−05 |
| H | 0.00E+00 | 0.00E+00 | 0.00E+00 | 0.00E+00 | 0.00E+00 | 0.00E+00 | 0.00E+00 |
| J | 0.00E+00 | 0.00E+00 | 0.00E+00 | 0.00E+00 | 0.00E+00 | 0.00E+00 | 0.00E+00 |
| L | 0.00E+00 | 0.00E+00 | 0.00E+00 | 0.00E+00 | 0.00E+00 | 0.00E+00 | 0.00E+00 |
| M | 0.00E+00 | 0.00E+00 | 0.00E+00 | 0.00E+00 | 0.00E+00 | 0.00E+00 | 0.00E+00 |
| N | 0.00E+00 | 0.00E+00 | 0.00E+00 | 0.00E+00 | 0.00E+00 | 0.00E+00 | 0.00E+00 |
| O | 0.00E+00 | 0.00E+00 | 0.00E+00 | 0.00E+00 | 0.00E+00 | 0.00E+00 | 0.00E+00 |
| P | 0.00E+00 | 0.00E+00 | 0.00E+00 | 0.00E+00 | 0.00E+00 | 0.00E+00 | 0.00E+00 |

| Surface | 12 | 13 | 14 | 15 | 16 | 17 | 18 |
|---|---|---|---|---|---|---|---|
| K | −2.84E+00 | −7.04E−02 | −6.82E+00 | 2.23E+00 | −9.90E+01 | 8.96E−02 | −1.82E+01 |
| A | −1.18E−02 | 2.62E−04 | −4.01E−04 | −1.56E−02 | −1.44E−04 | 7.87E−03 | 8.23E−03 |
| B | 1.35E−02 | 1.38E−02 | 3.25E−02 | 5.00E−02 | 3.75E−03 | −4.06E−02 | −3.57E−02 |
| C | −7.64E−03 | −5.56E−03 | −4.98E−02 | −9.26E−02 | −1.39E−02 | 8.23E−02 | 8.07E−02 |
| D | 8.93E−04 | −2.59E−03 | 4.24E−02 | 9.07E−02 | 1.72E−02 | −9.08E−02 | −9.99E−02 |
| E | 1.10E−03 | 3.11E−03 | −2.00E−02 | −4.75E−02 | −9.75E−03 | 5.75E−02 | 7.14E−02 |
| F | −5.01E−04 | −1.02E−03 | 4.91E−03 | 1.26E−02 | 2.62E−03 | −2.04E−02 | −2.93E−02 |
| G | 6.67E−05 | 1.15E−04 | −4.86E−04 | −1.34E−03 | −2.72E−04 | 3.64E−03 | 6.41E−03 |
| H | 0.00E+00 | 0.00E+00 | 0.00E+00 | 0.00E+00 | 0.00E+00 | −2.43E−04 | −5.76E−04 |
| J | 0.00E+00 | 0.00E+00 | 0.00E+00 | 0.00E+00 | 0.00E+00 | 0.00E+00 | 0.00E+00 |
| L | 0.00E+00 | 0.00E+00 | 0.00E+00 | 0.00E+00 | 0.00E+00 | 0.00E+00 | 0.00E+00 |
| M | 0.00E+00 | 0.00E+00 | 0.00E+00 | 0.00E+00 | 0.00E+00 | 0.00E+00 | 0.00E+00 |
| N | 0.00E+00 | 0.00E+00 | 0.00E+00 | 0.00E+00 | 0.00E+00 | 0.00E+00 | 0.00E+00 |
| O | 0.00E+00 | 0.00E+00 | 0.00E+00 | 0.00E+00 | 0.00E+00 | 0.00E+00 | 0.00E+00 |
| P | 0.00E+00 | 0.00E+00 | 0.00E+00 | 0.00E+00 | 0.00E+00 | 0.00E+00 | 0.00E+00 |

Fourth Embodiment

Figure 4A:
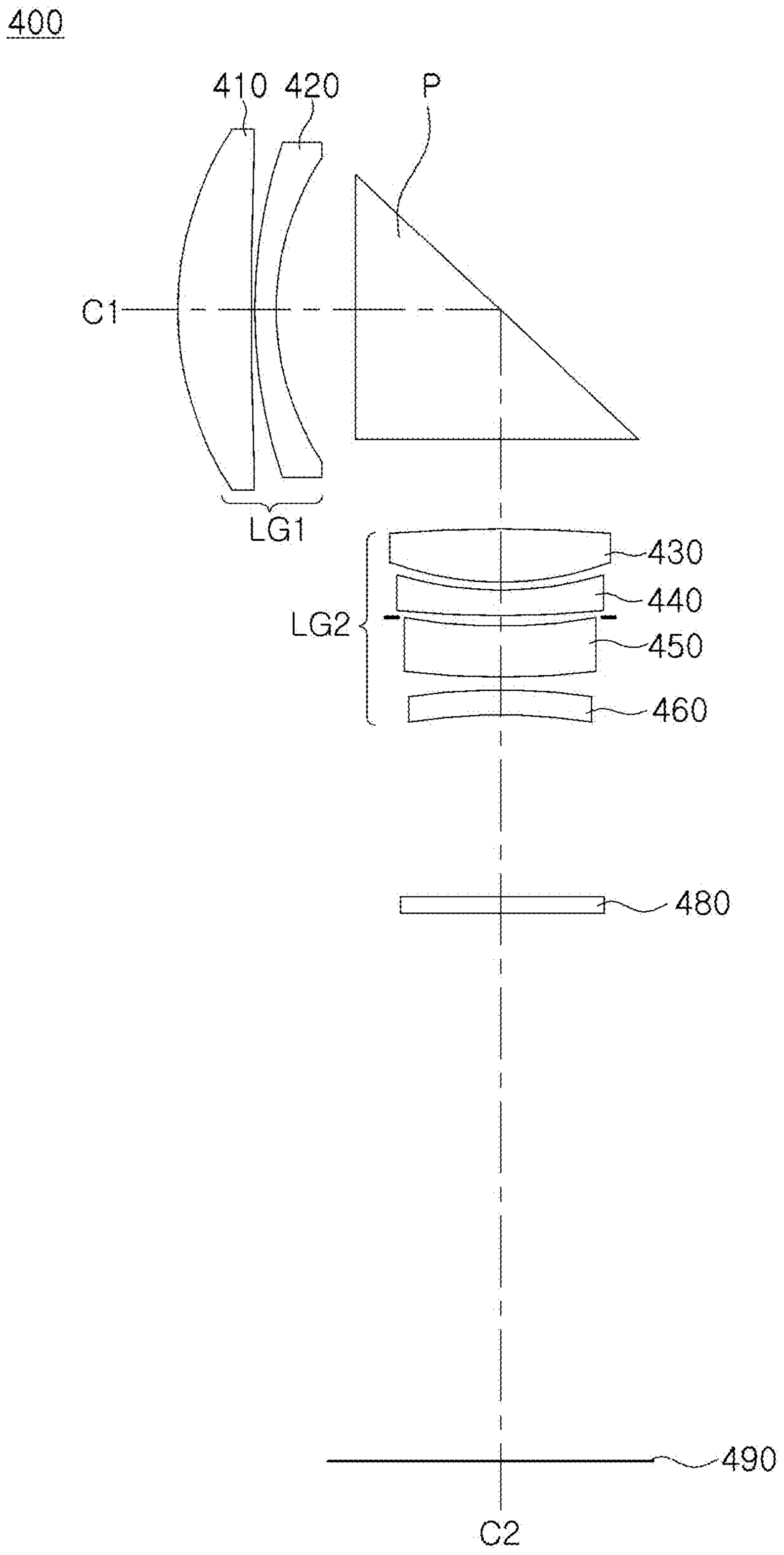
FIG. 4A is a configuration diagram illustrating an example optical imaging system in accordance with a fourth embodiment.
Figure 4B:
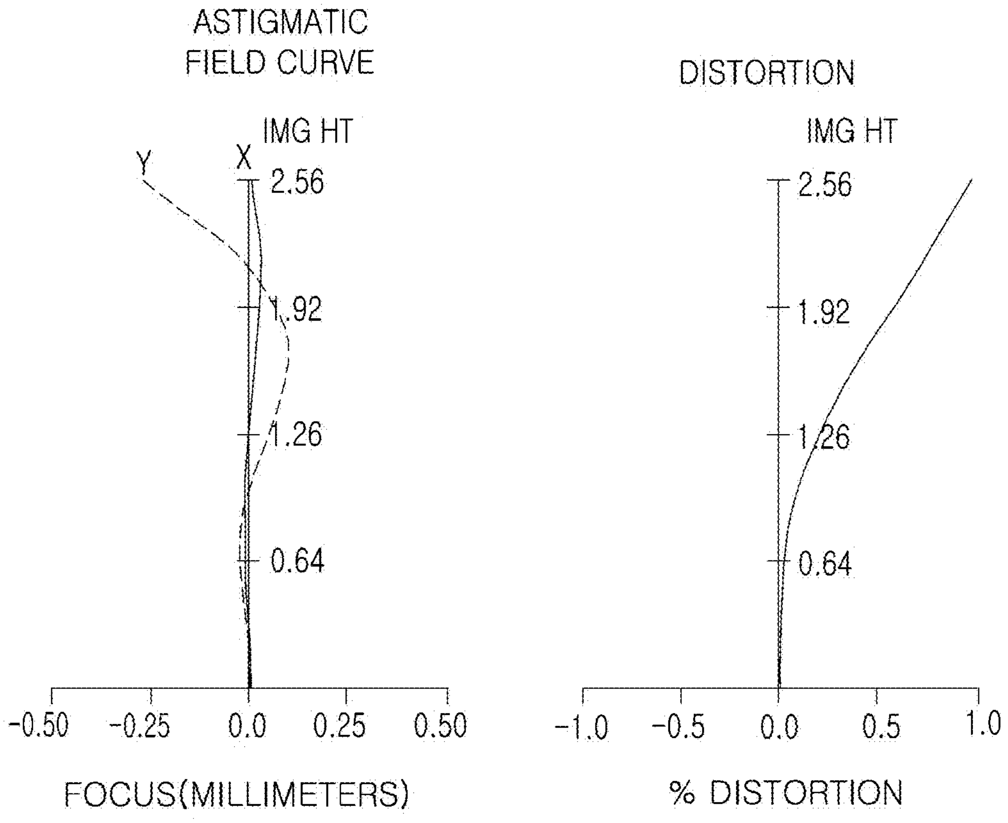
FIG. 4B is a graph indicating aberration properties of an example optical imaging system in accordance with the fourth embodiment.

FIG. 4A is a configuration diagram illustrating an example optical imaging system 400 according to a fourth embodiment. FIG. 4B is a graph illustrating aberration properties of the example optical imaging system 400 according to the fourth embodiment.

The optical imaging system 400 according to the fourth embodiment may include a first lens 410, a second lens 420, a third lens 430, a fourth lens 440, a fifth lens 450 and a sixth lens 460 disposed in order from an object side toward an imaging plane, and may further include an infrared blocking filter 480 and an image sensor 490 disposed on an image side of the sixth lens 460.

The first lens 410 may have positive refractive power. An object-side surface and an image-side surface of the first lens 410 may be convex in a paraxial region. The first lens 410 may be formed of a plastic material. The first lens 410 may be an aspherical lens. For example, an object-side surface and an image-side surface of the first lens 410 may be aspherical.

The second lens 420 may have negative refractive power. An object-side surface of the second lens 420 may be convex in a paraxial region, and an image-side surface of the second lens 420 may be concave in the paraxial region. The second lens 420 may be formed of a plastic material. Specifically, the second lens 420 may be formed of a plastic material having optical properties (e.g., a refractive index and an Abbe number) different from those of the first lens 410. The second lens 420 may be an aspherical lens. For example, an object-side surface and an image-side surface of the second lens 420 may be aspherical.

The third lens 430 may have positive refractive power. An object-side surface and an image-side surface of the third lens 430 may be convex in a paraxial region. The third lens 430 may be formed of a plastic material. Specifically, the third lens 430 may be formed of a plastic material having optical properties (e.g., a refractive index and an Abbe number) different from those of the second lens 420. The third lens 430 may be an aspherical lens. For example, an object-side surface and an image-side surface of the third lens 430 may be aspherical.

The fourth lens 440 may have negative refractive power. An object-side surface of the fourth lens 440 may be concave in a paraxial region, and an image-side surface of the fourth lens 440 may be convex in the paraxial region. The fourth lens 440 may be formed of a plastic material. Specifically, the fourth lens 440 may be formed of a plastic material having optical properties (e.g., a refractive index and an Abbe number) different from those of the third lens 430. The fourth lens 440 may be an aspherical lens. For example, an object-side surface and an image-side surface of the fourth lens 440 may be aspherical.

The fifth lens 450 may have negative refractive power. An object-side surface of the fifth lens 450 may be concave in a paraxial region, and an image-side surface of the fifth lens 450 may be convex in the paraxial region. The fifth lens 450 may be formed of a plastic material. Specifically, the fifth lens 450 may be formed of a plastic material having optical properties (e.g., a refractive index and an Abbe number) different from those of the fourth lens 440. The fifth lens 450 may be an aspherical lens. For example, an object-side surface and an image-side surface of the fifth lens 450 may be aspherical.

The sixth lens 460 may have negative refractive power. An object-side surface of the sixth lens 460 may be convex in a paraxial region, and an image-side surface of the sixth lens 460 may be concave in the paraxial region. The sixth lens 460 may be formed of a plastic material. Specifically, the sixth lens 460 may be formed of a plastic material having optical properties (e.g., a refractive index and an Abbe number) different from those of the fifth lens 450. The sixth lens 460 may be an aspherical lens. For example, an object-side surface and an image-side surface of the sixth lens 460 may be aspherical.

In an example, a prism P may be disposed between the second lens 420 and the third lens 430. The first lens 410 and the second lens 420 may be disposed on an object side with respect to the prism P, and may be included in the first lens group LG1, and the third lens to the sixth lens 430-460 may be disposed on an image side with respect to the prism P, and may be included in the second lens group LG2. The first lens group LG1 may have positive refractive power, and the second lens group LG2 may have negative refractive power.

Table 7 below lists optical and physical parameters of the optical imaging system 400 according to the fourth embodiment.

TABLE 7

| Surface | Radius | Thickness/ Distance | Index | Abbe number | Semi-Aperture |
|---|---|---|---|---|---|
| Object | Infinity | Infinity | | | |
| 1 | Infinity | 0.000 | | | |
| 2 | 5.239 | 1.200 | 1.544 | 56.0 | 3.00 |
| 3 | −569.193 | 0.075 | | | 2.95 |
| 4 | 10.333 | 0.350 | 1.614 | 25.9 | 2.79 |
| 5 | 5.344 | 1.385 | | | 2.56 |
| 6 | Infinity | 2.250 | 1.834 | 37.3 | 2.10 |
| 7 | Infinity | 2.250 | 1.834 | 37.3 | 3.30 |
| 8 | Infinity | 2.266 | | | 1.76 |
| 9 | 61.642 | 0.747 | 1.660 | 20.4 | 1.72 |
| 10 | −6.163 | 0.137 | | | 1.65 |
| 11 | −4.329 | 0.422 | 1.639 | 23.5 | 1.60 |
| 12 | −12.964 | 0.217 | | | 1.52 |
| 13 | −7.626 | 0.800 | 1.614 | 25.9 | 1.50 |
| 14 | −22.921 | 0.278 | | | 1.46 |
| 15 | 13.629 | 0.400 | 1.544 | 56.0 | 1.42 |
| 16 | 9.852 | 3.000 | | | 1.38 |
| 17 | Infinity | 0.210 | 1.518 | 64.2 | 1.63 |
| 18 | Infinity | 9.062 | | | 1.64 |
| Image | Infinity | | | | 2.56 |

Table 8 below lists aspherical data of the example optical imaging system 400 according to the fourth embodiment.

TABLE 8

| Surface | 2 | 3 | 4 | 5 | 9 | 10 |
|---|---|---|---|---|---|---|
| K | 2.71E−01 | 1.00E+01 | −1.01E+00 | 5.61E−01 | 3.00E+01 | −2.68E+00 |
| A | −7.10E−04 | 8.00E−05 | −1.41E−03 | −2.36E−03 | −2.96E−04 | −1.19E−02 |
| B | 7.12E−04 | 4.43E−04 | −2.17E−04 | 6.32E−04 | 1.71E−03 | 1.35E−02 |
| C | −2.72E−04 | −1.48E−04 | 1.67E−04 | −3.38E−04 | −9.08E−04 | −7.64E−03 |
| D | 5.76E−05 | 2.02E−05 | −3.54E−05 | 1.32E−04 | −4.44E−04 | 8.95E−04 |
| E | −7.33E−06 | −9.63E−07 | 5.29E−06 | −2.34E−05 | 5.88E−04 | 1.10E−03 |
| F | 5.19E−07 | −2.17E−08 | −4.84E−07 | 1.94E−06 | −2.03E−04 | −5.01E−04 |
| G | −1.60E−08 | 1.81E−09 | 1.82E−08 | −6.19E−08 | 2.47E−05 | 6.67E−05 |
| H | 0.00E+00 | 0.00E+00 | 0.00E+00 | 0.00E+00 | 0.00E+00 | 0.00E+00 |
| J | 0.00E+00 | 0.00E+00 | 0.00E+00 | 0.00E+00 | 0.00E+00 | 0.00E+00 |
| L | 0.00E+00 | 0.00E+00 | 0.00E+00 | 0.00E+00 | 0.00E+00 | 0.00E+00 |
| M | 0.00E+00 | 0.00E+00 | 0.00E+00 | 0.00E+00 | 0.00E+00 | 0.00E+00 |
| N | 0.00E+00 | 0.00E+00 | 0.00E+00 | 0.00E+00 | 0.00E+00 | 0.00E+00 |
| O | 0.00E+00 | 0.00E+00 | 0.00E+00 | 0.00E+00 | 0.00E+00 | 0.00E+00 |
| P | 0.00E+00 | 0.00E+00 | 0.00E+00 | 0.00E+00 | 0.00E+00 | 0.00E+00 |

| Surface | 11 | 12 | 13 | 14 | 15 | 16 |
|---|---|---|---|---|---|---|
| K | −1.07E−01 | 9.86E−01 | 1.22E+00 | 8.66E+01 | −1.47E+00 | −1.78E+01 |
| A | 3.22E−04 | −5.63E−04 | −1.55E−02 | −1.88E−04 | 7.73E−03 | 8.36E−03 |
| B | 1.38E−02 | 3.24E−02 | 5.01E−02 | 3.79E−03 | −4.08E−02 | −3.55E−02 |
| C | −5.56E−03 | −4.98E−02 | −9.26E−02 | −1.38E−02 | 8.23E−02 | 8.07E−02 |
| D | −2.59E−03 | 4.24E−02 | 9.07E−02 | 1.72E−02 | −9.08E−02 | −9.99E−02 |
| E | 3.11E−03 | −2.00E−02 | −4.75E−02 | −9.75E−03 | 5.75E−02 | 7.14E−02 |
| F | −1.02E−03 | 4.91E−03 | 1.26E−02 | 2.62E−03 | −2.04E−02 | −2.93E−02 |
| G | 1.15E−04 | −4.86E−04 | −1.34E−03 | −2.72E−04 | 3.64E−03 | 6.41E−03 |
| H | 0.00E+00 | 0.00E+00 | 0.00E+00 | 0.00E+00 | −2.43E−04 | −5.76E−04 |
| J | 0.00E+00 | 0.00E+00 | 0.00E+00 | 0.00E+00 | 0.00E+00 | 0.00E+00 |
| L | 0.00E+00 | 0.00E+00 | 0.00E+00 | 0.00E+00 | 0.00E+00 | 0.00E+00 |
| M | 0.00E+00 | 0.00E+00 | 0.00E+00 | 0.00E+00 | 0.00E+00 | 0.00E+00 |
| N | 0.00E+00 | 0.00E+00 | 0.00E+00 | 0.00E+00 | 0.00E+00 | 0.00E+00 |
| O | 0.00E+00 | 0.00E+00 | 0.00E+00 | 0.00E+00 | 0.00E+00 | 0.00E+00 |
| P | 0.00E+00 | 0.00E+00 | 0.00E+00 | 0.00E+00 | 0.00E+00 | 0.00E+00 |

Fifth Embodiment

Figure 5A:
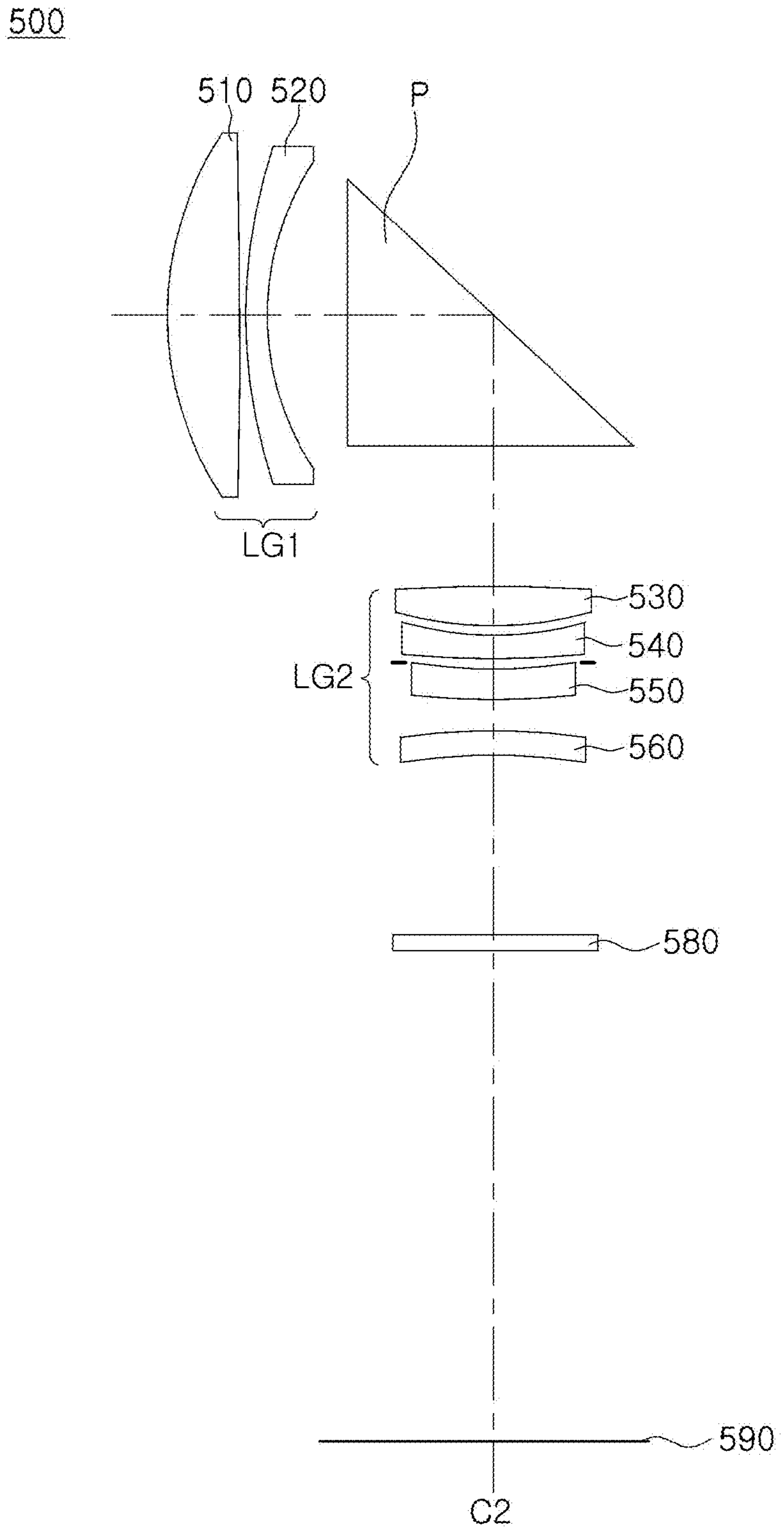
FIG. 5A is a configuration diagram illustrating an example optical imaging system in accordance with a fifth embodiment.
Figure 5B:
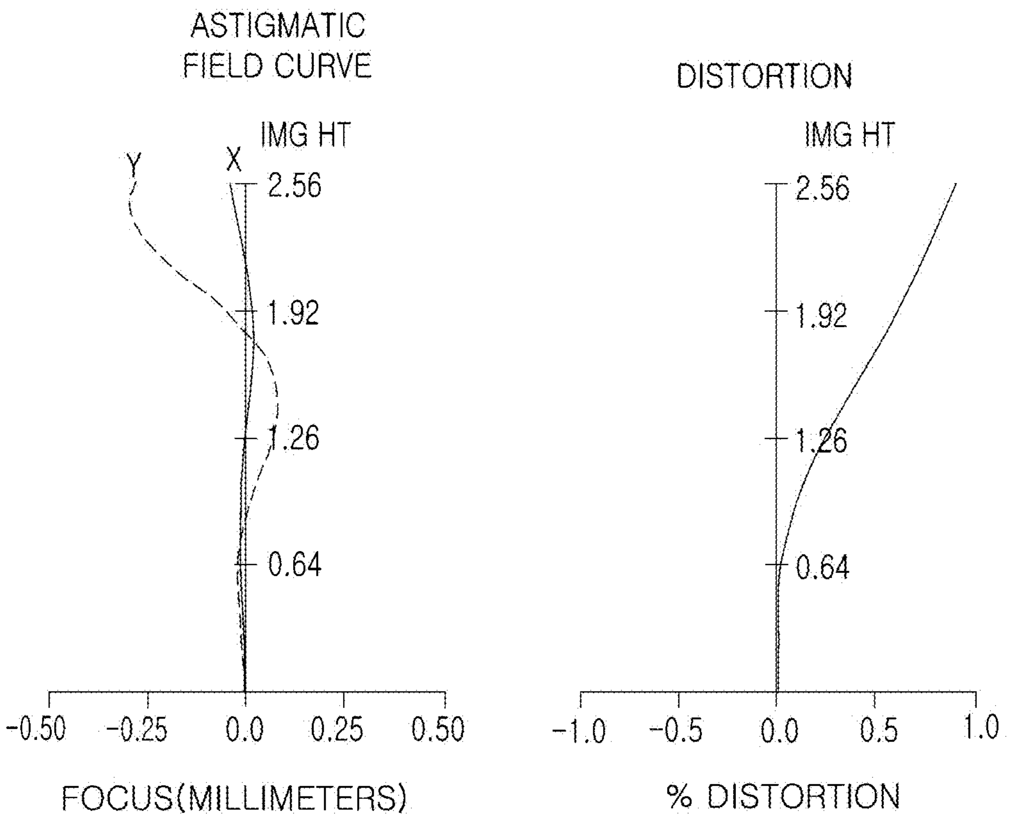
FIG. 5B is a graph indicating aberration properties of an example optical imaging system in accordance with the fifth embodiment.

FIG. 5A is a configuration diagram illustrating an example optical imaging system 500 according to a fifth embodiment. FIG. 5B is a graph illustrating aberration properties of the example optical imaging system according to the fifth embodiment.

The optical imaging system 500 according to the fifth embodiment may include a first lens 510, a second lens 520, a third lens 530, a fourth lens 540, a fifth lens 550 and a sixth lens 560 disposed in order from an object side to an imaging plane, and may further include an infrared blocking filter 580 and an image sensor 590 disposed on an image side of the sixth lens 560.

The first lens 510 may have positive refractive power. An object-side surface and an image-side surface of the first lens 510 may be convex in a paraxial region. The first lens 510 may be formed of a plastic material. The first lens 510 may be an aspherical lens. For example, an object-side surface and an image-side surface of the first lens 510 may be aspherical.

The second lens 520 may have negative refractive power. An object-side surface of the second lens 520 may be convex in a paraxial region, and an image-side surface of the second lens 520 may be concave in the paraxial region. The second lens 520 may be formed of a plastic material. Specifically, the second lens 520 may be formed of a plastic material having optical properties (e.g., a refractive index and an Abbe number) different from those of the first lens 510. The second lens 520 may be an aspherical lens. For example, an object-side surface and an image-side surface of the second lens 520 may be aspherical.

The third lens 530 may have positive refractive power. An object-side surface and an image-side surface of the third lens 530 may be convex in the paraxial region. The third lens 530 may be formed of a plastic material. Specifically, the third lens 530 may be formed of a plastic material having optical properties (e.g., a refractive index and an Abbe number) different from those of the second lens 520. The third lens 530 may be an aspherical lens. For example, an object-side surface and an image-side surface of the third lens 530 may be aspherical.

The fourth lens 540 may have negative refractive power. An object-side surface of the fourth lens 540 may be concave in a paraxial region, and an image-side surface of the fourth lens 540 may be convex in the paraxial region. The fourth lens 540 may be formed of a plastic material. Specifically, the fourth lens 540 may be formed of a plastic material having optical properties (e.g., at refractive index and an Abbe number) different from those of the third lens 530. The fourth lens 540 may be an aspherical lens. For example, an object-side surface and an image-side surface of the fourth lens 540 may be aspherical.

The fifth lens 550 may have negative refractive power. An object-side surface of the fifth lens 550 may be concave in a paraxial region, and an image-side surface of the fifth lens 550 may be convex in the paraxial region. The fifth lens 550 may be formed of a plastic material. Specifically, the fifth lens 550 may be formed of a plastic material having optical properties (e.g., a refractive index and an Abbe number) different from those of the fourth lens 540. The fifth lens 550 may be an aspherical lens. For example, an object-side surface and an image-side surface of the fifth lens 550 may be aspherical.

The sixth lens 560 may have negative refractive power. An object-side surface of the sixth lens 560 may be convex in a paraxial region, and an image-side surface of the sixth lens 560 may be convex in the paraxial region. The sixth lens 560 may be formed of a plastic material. Specifically, the sixth lens 560 may be formed of a plastic material having optical properties (e.g., a refractive index and an Abbe number) different from those of the fifth lens 550. The sixth lens 560 may be an aspherical lens. For example, an object-side surface and an image-side surface of the sixth lens 560 may be aspherical.

In an example a prism P may be disposed between the second lens 520 and the third lens 530. The first lens 510 and the second lens 520 may be disposed on an object side with respect to the prism P, and may be included in the first lens group LG1, and the third lens to the sixth lens 530-560 may be disposed on an image side with respect to the prism P, and may be included in the second lens group LG2. The first lens group LG1 may have positive refractive power, and the second lens group LG2 may have negative refractive power.

Table 9 below lists optical and physical parameters of the example optical imaging system 500 according to the fifth embodiment.

TABLE 9

| Surface | Radius | Thickness/ Distance | Index | Abbe number | Semi-Aperture |
|---|---|---|---|---|---|
| Object | Infinity | Infinity | | | |
| 1 | Infinity | 0.000 | | | |
| 2 | 5.196 | 1.200 | 1.544 | 56.0 | 3.00 |
| 3 | −468.844 | 0.075 | | | 2.95 |
| 4 | 11.048 | 0.350 | 1.614 | 25.9 | 2.80 |
| 5 | 5.387 | 1.385 | | | 2.57 |
| 6 | Infinity | 2.250 | 1.834 | 37.3 | 2.10 |
| 7 | Infinity | 2.250 | 1.834 | 37.3 | 3.30 |
| 8 | Infinity | 3.015 | | | 1.76 |
| 9 | 47.093 | 0.631 | 1.660 | 20.4 | 1.62 |
| 10 | −5.762 | 0.156 | | | 1.57 |
| 11 | −4.170 | 0.400 | 1.639 | 23.5 | 1.51 |
| 12 | −8.269 | 0.179 | | | 1.43 |
| 13 | −6.385 | 0.400 | 1.614 | 25.9 | 1.42 |
| 14 | Infinity | 0.600 | | | 1.41 |
| 15 | 10.060 | 0.400 | 1.544 | 56.0 | 1.40 |
| 16 | 8.635 | 3.000 | | | 1.38 |
| 17 | Infinity | 0.210 | 1.518 | 64.2 | 1.66 |
| 18 | Infinity | 8.024 | | | 1.68 |
| Image | Infinity | | | | 2.56 |

Table 10 below lists aspherical data of the example optical imaging system 500 according to the fifth embodiment.

TABLE 10

| Surface | 2 | 3 | 4 | 5 | 9 | 10 |
|---|---|---|---|---|---|---|
| K | 2.69E−01 | 4.03E+00 | −1.18E+00 | 5.68E−01 | 3.00E+01 | −2.52E+00 |
| A | −7.21E−04 | 8.36E−05 | −1.43E−03 | −2.34E−03 | −1.83E−04 | −1.20E−02 |
| B | 7.13E−04 | 4.42E−04 | −2.19E−04 | 6.31E−04 | 1.77E−03 | 1.34E−02 |
| C | −2.72E−04 | −1.48E−04 | 1.67E−04 | −3.38E−04 | −9.03E−04 | −7.63E−03 |
| D | 5.76E−05 | 2.02E−05 | −3.54E−05 | 1.32E−04 | −4.45E−04 | 9.02E−04 |
| E | −7.33E−06 | −9.61E−07 | 5.28E−06 | −2.34E−05 | 5.90E−04 | 1.10E−03 |
| F | 5.19E−07 | −2.15E−08 | −4.85E−07 | 1.94E−06 | −2.03E−04 | −5.01E−04 |

TABLE 10-continued

| | | | | | | |
|---|---|---|---|---|---|---|
| G | −1.60E−08 | 1.81E−09 | 1.83E−08 | −6.24E−08 | 2.47E−05 | 6.67E−05 |
| H | 0.00E+00 | 0.00E+00 | 0.00E+00 | 0.00E+00 | 0.00E+00 | 0.00E+00 |
| J | 0.00E+00 | 0.00E+00 | 0.00E+00 | 0.00E+00 | 0.00E+00 | 0.00E+00 |
| L | 0.00E+00 | 0.00E+00 | 0.00E+00 | 0.00E+00 | 0.00E+00 | 0.00E+00 |
| M | 0.00E+00 | 0.00E+00 | 0.00E+00 | 0.00E+00 | 0.00E+00 | 0.00E+00 |
| N | 0.00E+00 | 0.00E+00 | 0.00E+00 | 0.00E+00 | 0.00E+00 | 0.00E+00 |
| O | 0.00E+00 | 0.00E+00 | 0.00E+00 | 0.00E+00 | 0.00E+00 | 0.00E+00 |
| P | 0.00E+00 | 0.00E+00 | 0.00E+00 | 0.00E+00 | 0.00E+00 | 0.00E+00 |

| Surface | 11 | 12 | 13 | 14 | 15 | 16 |
|---|---|---|---|---|---|---|
| K | −1.31E−01 | 7.81E−01 | 1.34E+00 | 0.00E+00 | −1.44E+00 | −2.05E+01 |
| A | 3.60E−04 | −6.04E−04 | 1.69E−02 | 0.00E+00 | 7.72E−03 | 8.24E−03 |
| B | 1.38E−02 | 3.23E−02 | −5.42E−02 | 0.00E+00 | −4.08E−02 | −3.53E−02 |
| C | −5.56E−03 | −4.99E−02 | 9.57E−02 | 0.00E+00 | 8.23E−02 | 8.08E−02 |
| D | −2.60E−03 | 4.24E−02 | −9.14E−02 | 0.00E+00 | −9.08E−02 | −1.00E−01 |
| E | 3.11E−03 | −2.00E−02 | 4.75E−02 | 0.00E+00 | 5.75E−02 | 7.14E−02 |
| F | −1.02E−03 | 4.91E−03 | −1.26E−02 | 0.00E+00 | −2.04E−02 | −2.93E−02 |
| G | 1.15E−04 | −4.86E−04 | 1.34E−03 | 0.00E+00 | 3.64E−03 | 6.41E−03 |
| H | 0.00E+00 | 0.00E+00 | 0.00E+00 | 0.00E+00 | −2.43E−04 | −5.76E−04 |
| J | 0.00E+00 | 0.00E+00 | 0.00E+00 | 0.00E+00 | 0.00E+00 | 0.00E+00 |
| L | 0.00E+00 | 0.00E+00 | 0.00E+00 | 0.00E+00 | 0.00E+00 | 0.00E+00 |
| M | 0.00E+00 | 0.00E+00 | 0.00E+00 | 0.00E+00 | 0.00E+00 | 0.00E+00 |
| N | 0.00E+00 | 0.00E+00 | 0.00E+00 | 0.00E+00 | 0.00E+00 | 0.00E+00 |
| O | 0.00E+00 | 0.00E+00 | 0.00E+00 | 0.00E+00 | 0.00E+00 | 0.00E+00 |
| P | 0.00E+00 | 0.00E+00 | 0.00E+00 | 0.00E+00 | 0.00E+00 | 0.00E+00 |

Sixth Embodiment

Figure 6A:
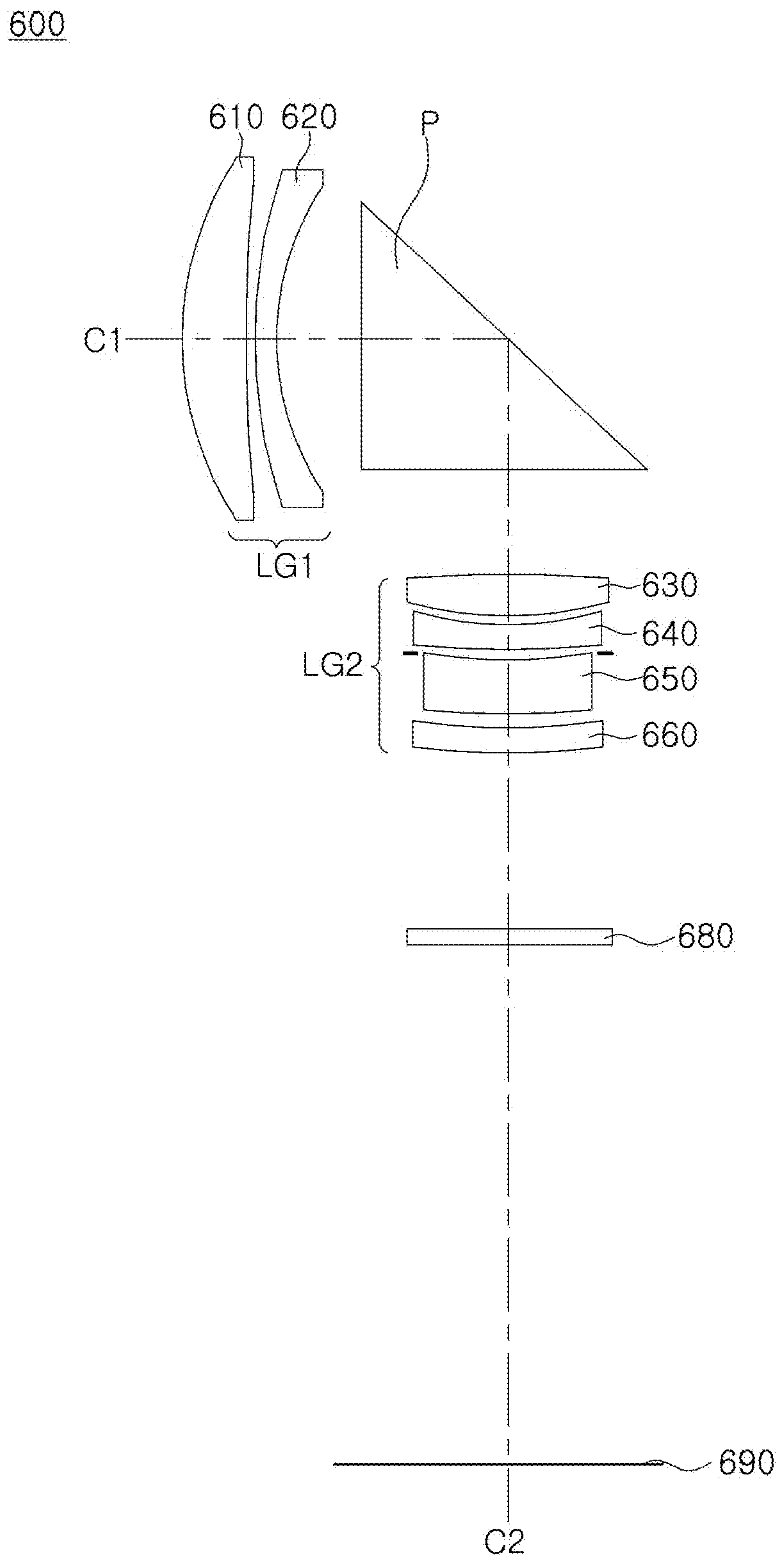
FIG. 6A is a configuration diagram illustrating an example optical imaging system according to a sixth embodiment.
Figure 6B:
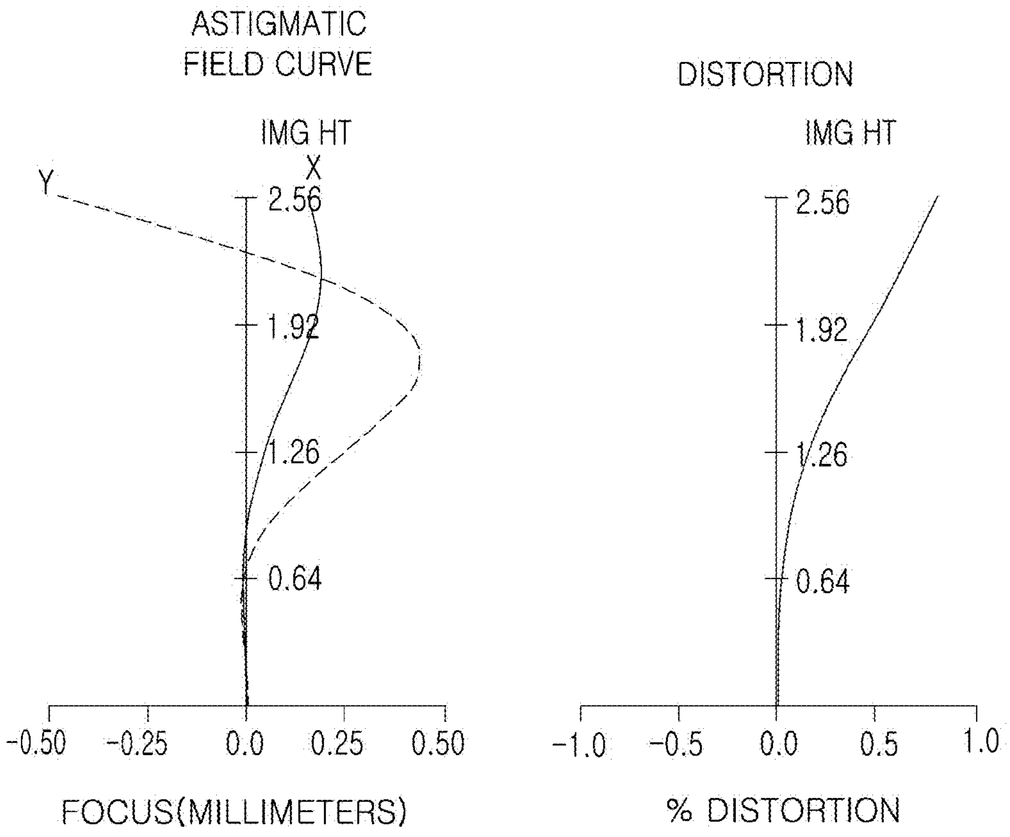
FIG. 6B is a graph indicating aberration properties of an example optical imaging system in accordance with the sixth embodiment.

FIG. 6A is a configuration diagram illustrating an example optical imaging system 600 according to a sixth embodiment. FIG. 6B is a graph illustrating aberration properties of the example optical imaging system according to the sixth embodiment.

The optical imaging system 600 according to the sixth embodiment may include a first lens 610, a second lens 620, a third lens 630, a fourth lens 640, a fifth lens 650 and a sixth lens 660 disposed in order from an object side to an imaging plane, and may further include an infrared blocking filter 680 and an image sensor 690 disposed on an image side of the sixth lens 660.

The first lens 610 may have positive refractive power. An object-side surface of the first lens 610 may be convex in a paraxial region, and an image-side surface of the first lens 610 may be concave in the paraxial region. The first lens 610 may be formed of a plastic material. The first lens 610 may be an aspherical lens. For example, an object-side surface and an image-side surface of the first lens 610 may be aspherical.

The second lens 620 may have negative refractive power. An object-side surface of the second lens 620 may be convex in a paraxial region, and an image-side surface of the second lens 620 may be concave in the paraxial region. The second lens 620 may be formed of a plastic material. Specifically, the second lens 620 may be formed of a plastic material having optical properties (e.g., a refractive index and an Abbe number) different from those of the first lens 610. The second lens 620 may be an aspherical lens. For example, an object-side surface and an image-side surface of the second lens 620 may be aspherical.

The third lens 630 may have positive refractive power. An object-side surface and an image-side surface of the third lens 630 may be convex in the paraxial region. The third lens 630 may be formed of a plastic material. Specifically, the third lens 630 may be formed of a plastic material having optical properties (e.g., a refractive index and an Abbe number) different from those of the second lens 620. The third lens 630 may be an aspherical lens. For example, an object-side surface and an image-side surface of the third lens 630 may be aspherical.

The fourth lens 640 may have negative refractive power. An object-side surface of the fourth lens 640 may be concave in a paraxial region, and an image-side surface of the fourth lens 640 may be convex in the paraxial region. The fourth lens 640 may be formed of a plastic material. Specifically, the fourth lens 640 may be formed of a plastic material having optical properties (e.g., a refractive index and an Abbe number) different from those of the third lens 630. The fourth lens 640 may be an aspherical lens. For example, an object-side surface and an image-side surface of the fourth lens 640 may be aspherical.

The fifth lens 650 may have negative refractive power. An object-side surface of the fifth lens 650 may be concave in a paraxial region, and an image-side surface of the fifth lens 650 may be convex in the paraxial region. The fifth lens 650 may be formed of a plastic material. Specifically, the fifth lens 650 may be formed of a plastic material having optical properties (e.g., a refractive index and an Abbe number) different from those of the fourth lens 640. The fifth lens 650 may be an aspherical lens. For example, an object-side surface and an image-side surface of the fifth lens 650 may be aspherical.

The sixth lens 660 may have negative refractive power. An object-side surface of the sixth lens 660 may be concave in a paraxial region, and an image-side surface of the sixth lens 660 may be convex in the paraxial region. The sixth lens 660 may be formed of a plastic material. Specifically, the sixth lens 660 may be formed of a plastic material having optical properties (e.g., a refractive index and an Abbe number) different from those of the fifth lens 650. The sixth lens 660 may be an aspherical lens. For example, an object-side surface and an image-side surface of the sixth lens 660 may be aspherical.

In an example, a prism P may be disposed between the second lens 620 and the third lens 630. The first lens 610 and the second lens 620 may be disposed on an object side with respect to the prism P, and may be included in the first lens group LG1, and the third lens to the sixth lens 630-660 may be disposed on an image side with respect to the prism P, and may be included in the second lens group LG2. The first lens group LG1 may have positive refractive power, and the second lens group LG2 may have negative refractive power.

Table 11 below lists optical and physical parameters of the example optical imaging system 600 according to the sixth embodiment.

TABLE 11

| Surface | Radius | Thickness/ Distance | Index | Abbe number | Semi- Aperture |
|---|---|---|---|---|---|
| Object | Infinity | Infinity | | | |
| 1 | Infinity | 0.000 | | | |
| 2 | 5.231 | 1.200 | 1.544 | 56.0 | 3.00 |
| 3 | 160.460 | 0.075 | | | 2.94 |
| 4 | 9.484 | 0.350 | 1.614 | 25.9 | 2.78 |
| 5 | 5.160 | 1.385 | | | 2.55 |
| 6 | Infinity | 2.250 | 1.834 | 37.3 | 2.10 |
| 7 | Infinity | 2.250 | 1.834 | 37.3 | 3.30 |
| 8 | Infinity | 2.250 | | | 1.76 |
| 9 | 20.929 | 0.683 | 1.660 | 20.4 | 1.65 |
| 10 | −8.385 | 0.123 | | | 1.59 |
| 11 | −5.347 | 0.401 | 1.639 | 23.5 | 1.55 |
| 12 | −25.233 | 0.238 | | | 1.46 |
| 13 | −8.701 | 0.800 | 1.614 | 25.9 | 1.44 |
| 14 | −31.571 | 0.166 | | | 1.39 |
| 15 | −9.655 | 0.402 | 1.544 | 56.0 | 1.38 |
| 16 | −11.121 | 3.000 | | | 1.42 |
| 17 | Infinity | 0.210 | 1.518 | 64.2 | 1.66 |
| 18 | Infinity | 9.612 | | | 1.67 |
| Image | Infinity | | | | 2.56 |

Table 12 below lists aspherical data of the example optical imaging system 600 according to the sixth embodiment.

TABLE 12

| Surface | 2 | 3 | 4 | 5 | 9 | 10 |
|---|---|---|---|---|---|---|
| K | 2.76E−01 | 2.59E+00 | −7.78E−01 | 5.42E−01 | −2.87E+01 | −2.88E+00 |
| A | −6.94E−04 | 7.78E−05 | −1.38E−03 | −2.40E−03 | −3.77E−04 | −1.18E−02 |
| B | 7.12E−04 | 4.44E−04 | −2.16E−04 | 6.32E−04 | 1.70E−03 | 1.35E−02 |
| C | −2.72E−04 | −1.48E−04 | 1.67E−04 | −3.38E−04 | −9.03E−04 | −7.64E−03 |
| D | 5.76E−05 | 2.02E−05 | −3.54E−05 | 1.32E−04 | −4.40E−04 | 8.96E−04 |
| E | −7.33E−06 | −9.64E−07 | 5.29E−06 | −2.34E−05 | 5.88E−04 | 1.10E−03 |
| F | 5.19E−07 | −2.18E−08 | −4.84E−07 | 1.94E−06 | −2.03E−04 | −5.01E−04 |
| G | −1.60E−08 | 1.77E−09 | 1.82E−08 | −6.16E−08 | 2.47E−05 | 6.67E−05 |
| H | 0.00E+00 | 0.00E+00 | 0.00E+00 | 0.00E+00 | 0.00E+00 | 0.00E+00 |
| J | 0.00E+00 | 0.00E+00 | 0.00E+00 | 0.00E+00 | 0.00E+00 | 0.00E+00 |
| L | 0.00E+00 | 0.00E+00 | 0.00E+00 | 0.00E+00 | 0.00E+00 | 0.00E+00 |
| M | 0.00E+00 | 0.00E+00 | 0.00E+00 | 0.00E+00 | 0.00E+00 | 0.00E+00 |
| N | 0.00E+00 | 0.00E+00 | 0.00E+00 | 0.00E+00 | 0.00E+00 | 0.00E+00 |
| O | 0.00E+00 | 0.00E+00 | 0.00E+00 | 0.00E+00 | 0.00E+00 | 0.00E+00 |
| P | 0.00E+00 | 0.00E+00 | 0.00E+00 | 0.00E+00 | 0.00E+00 | 0.00E+00 |

| Surface | 11 | 12 | 13 | 14 | 15 | 16 |
|---|---|---|---|---|---|---|
| K | −1.09E−01 | −2.96E+00 | 1.57E+00 | 7.84E+01 | −1.76E−01 | −6.58E−02 |
| A | 2.91E−04 | −4.28E−04 | −1.56E−02 | −1.25E−04 | −8.31E−03 | −7.84E−03 |
| B | 1.38E−02 | 3.24E−02 | 5.01E−02 | 3.82E−03 | 3.56E−02 | 4.08E−02 |
| C | −5.55E−03 | −4.98E−02 | −9.26E−02 | −1.38E−02 | −8.07E−02 | −8.23E−02 |
| D | −2.59E−03 | 4.24E−02 | 9.07E−02 | 1.72E−02 | 9.99E−02 | 9.07E−02 |
| E | 3.11E−03 | −2.00E−02 | −4.75E−02 | −9.75E−03 | −7.14E−02 | −5.75E−02 |
| F | −1.02E−03 | 4.91E−03 | 1.26E−02 | 2.62E−03 | 2.93E−02 | 2.04E−02 |
| G | 1.15E−04 | −4.86E−04 | −1.34E−03 | −2.72E−04 | −6.41E−03 | −3.64E−03 |
| H | 0.00E+00 | 0.00E+00 | 0.00E+00 | 0.00E+00 | 5.76E−04 | 2.43E−04 |
| J | 0.00E+00 | 0.00E+00 | 0.00E+00 | 0.00E+00 | 0.00E+00 | 0.00E+00 |
| L | 0.00E+00 | 0.00E+00 | 0.00E+00 | 0.00E+00 | 0.00E+00 | 0.00E+00 |
| M | 0.00E+00 | 0.00E+00 | 0.00E+00 | 0.00E+00 | 0.00E+00 | 0.00E+00 |
| N | 0.00E+00 | 0.00E+00 | 0.00E+00 | 0.00E+00 | 0.00E+00 | 0.00E+00 |
| O | 0.00E+00 | 0.00E+00 | 0.00E+00 | 0.00E+00 | 0.00E+00 | 0.00E+00 |
| P | 0.00E+00 | 0.00E+00 | 0.00E+00 | 0.00E+00 | 0.00E+00 | 0.00E+00 |

Seventh Embodiment

Figure 7A:
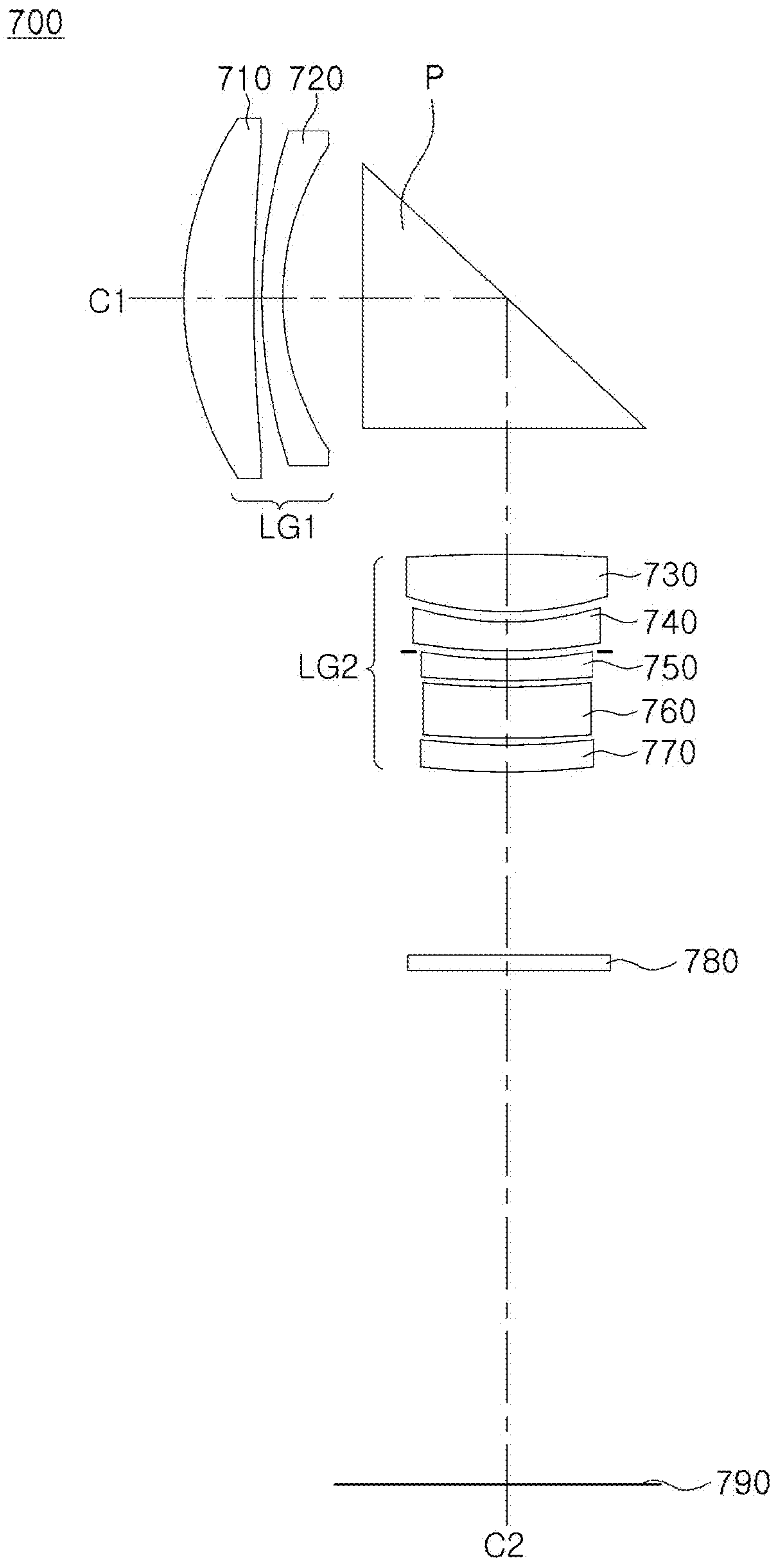
FIG. 7A is a configuration diagram illustrating an example optical imaging system in accordance with a seventh embodiment.
Figure 7B:
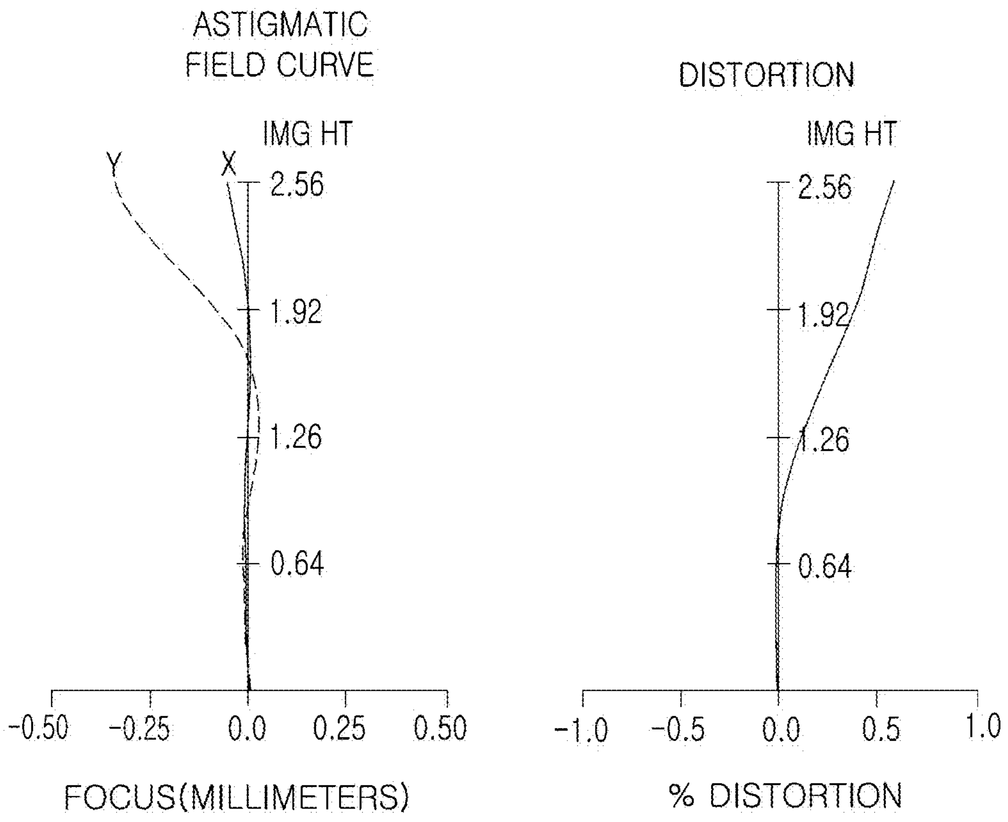
FIG. 7B is a graph indicating aberration properties of an example optical imaging system in accordance with the seventh embodiment.

FIG. 7A is a configuration diagram illustrating an example optical imaging system 700 according to a seventh embodiment. FIG. 7B is a graph illustrating aberration properties of the example optical imaging system according to the seventh embodiment.

The optical imaging system 700 according to the seventh embodiment may include a first lens 710, a second lens 720, a third lens 730, a fourth lens 740, a fifth lens 750, a sixth lens 760 and a seventh lens 770 disposed in order from an object side toward an imaging plane, and may further include an infrared blocking filter 780 and an image sensor 790 disposed on an image side of the seventh lens 770.

The first lens 710 may have positive refractive power. An object-side surface of the first lens 710 may be convex in a paraxial region, and an image-side surface of the first lens 710 may be concave in the paraxial region. The first lens 710 may be formed of a plastic material. The first lens 710 may be an aspherical lens. For example, an object-side surface and an image-side surface of the first lens 710 may be aspherical.

The second lens 720 may have negative refractive power. An object-side surface of the second lens 720 may be convex in a paraxial region, and an image-side surface of the second lens 720 may be concave in the paraxial region. The second lens 720 may be formed of a plastic material. Specifically, the second lens 720 may be formed of a plastic material having optical properties (e.g., a refractive index and an Abbe number) different from those of the first lens 710. The second lens 720 may be an aspherical lens. For example, an object-side surface and an image-side surface of the second lens 720 may be aspherical.

The third lens 730 may have positive refractive power. An object-side surface and an image-side surface of the third lens 730 may be convex in a paraxial region. The third lens 730 may be formed of a plastic material. Specifically, the third lens 730 may be formed of a plastic material having optical properties (e.g., a refractive index and an Abbe number) different from those of the second lens 720. The third lens 730 may be an aspherical lens. For example, an object-side surface and an image-side surface of the third lens 730 may be aspherical.

The fourth lens 740 may have negative refractive power. An object-side surface of the fourth lens 740 may be concave in a paraxial region, and an image-side surface of the fourth lens 740 may be convex in the paraxial region. The fourth lens 740 may be formed of a plastic material. Specifically, the fourth lens 740 may be formed of a plastic material having optical properties (e.g., a refractive index and an Abbe number) different from those of the third lens 730. The fourth lens 740 may be an aspherical lens. For example, an object-side surface and an image-side surface of the fourth lens 740 may be aspherical.

The fifth lens 750 may have positive refractive power. An object-side surface of the fifth lens 750 may be concave in a paraxial region, and an image-side surface of the fifth lens 750 may be convex in the paraxial region. The fifth lens 750 may be formed of a plastic material. Specifically, the fifth lens 750 may be formed of a plastic material having optical properties (e.g., a refractive index and an Abbe number) different from those of the fourth lens 740. The fifth lens 750 may be an aspherical lens. For example, an object-side surface and an image-side surface of the fifth lens 750 may be aspherical.

The sixth lens 760 may have negative refractive power. An object-side surface of the sixth lens 760 may be concave in a paraxial region, and an image-side surface of the sixth lens 760 may be convex in the paraxial region. The sixth lens 760 may be formed of a plastic material. Specifically, the sixth lens 760 may be formed of a plastic material having optical properties (e.g., a refractive index and an Abbe number) different from those of the fifth lens 750. The sixth lens 760 may be an aspherical lens. For example, an object-side surface and an image-side surface of the sixth lens 760 may be aspherical.

The seventh lens 770 may have negative refractive power. An object-side surface of the seventh lens 770 may be concave in a paraxial region, and an image-side surface of the seventh lens 770 may be convex in the paraxial region. The seventh lens 770 may be formed of a plastic material. Specifically, the seventh lens 770 may be formed of a plastic material having optical properties (e.g., a refractive index and an Abbe number) different from those of the sixth lens 760. The seventh lens 770 may be an aspherical lens. For example, an object-side surface and an image-side surface of the seventh lens 770 may be aspherical.

In an example, a prism P may be disposed between the second lens 720 and the third lens 730. The first lens 710 and the second lens 720 may be disposed on an object side with respect to the prism P, and may be included in the first lens group LG1, and the third lens to the seventh lens 730-770 may be disposed on an image side with respect to the prism P, and may be included in the second lens group LG2. The first lens group LG1 may have positive refractive power, and the second lens group LG2 may have negative refractive power.

Table 13 below lists optical and physical parameters of the example optical imaging system 700 according to the seventh embodiment.

TABLE 13

| Surface | Radius | Thickness/ Distance | Index | Abbe number | Semi-Aperture |
|---|---|---|---|---|---|
| Object | Infinity | Infinity | | | |
| 1 | Infinity | 0.000 | | | |
| 2 | 5.228 | 1.200 | 1.544 | 56.0 | 3.00 |
| 3 | 516.258 | 0.075 | | | 2.94 |
| 4 | 9.690 | 0.350 | 1.614 | 25.9 | 2.78 |
| 5 | 5.367 | 1.385 | | | 2.57 |
| 6 | Infinity | 2.250 | 1.834 | 37.3 | 2.10 |
| 7 | Infinity | 2.250 | 1.834 | 37.3 | 3.30 |
| 8 | Infinity | 2.285 | | | 1.76 |
| 9 | 60.009 | 0.996 | 1.660 | 20.4 | 1.68 |
| 10 | −6.323 | 0.152 | | | 1.58 |
| 11 | −4.308 | 0.400 | 1.639 | 23.5 | 1.53 |
| 12 | −29.166 | 0.176 | | | 1.44 |
| 13 | −14.496 | 0.400 | 1.535 | 55.7 | 1.43 |
| 14 | −11.88 | 0.100 | | | 1.41 |
| 15 | −10.094 | 0.700 | 1.614 | 25.9 | 1.40 |
| 16 | −22.110 | 0.151 | | | 1.39 |
| 17 | −9.235 | 0.439 | 1.544 | 56.0 | 1.38 |
| 18 | −13.68 | 3.000 | | | 1.42 |
| 19 | Infinity | 0.210 | 1.518 | 64.2 | 1.69 |
| 20 | Infinity | 8.522 | | | 1.70 |
| Image | Infinity | | | | 2.56 |

Table 14 below lists aspherical data of the example optical imaging system 700 according to the seventh embodiment.

TABLE 14

| Surface | 2 | 3 | 4 | 5 | 9 | 10 | 11 |
|---|---|---|---|---|---|---|---|
| K | 2.71E−01 | 1.00E+01 | −8.81E−01 | 5.55E−01 | −2.62E+01 | −3.23E+00 | −4.75E−02 |
| A | −7.06E−04 | 8.17E−05 | 1.39E−03 | −2.37E−03 | −4.71E−04 | −1.17E−02 | 1.83E−04 |
| B | 7.11E−04 | 4.44E−04 | −2.17E−04 | 6.33E−04 | 1.73E−03 | 1.34E−02 | 1.39E−02 |
| C | −2.72E−04 | −1.48E−04 | 1.67E−04 | −3.38E−04 | −8.95E−04 | −7.64E−03 | −5.54E−03 |
| D | 5.76E−05 | 2.02E−05 | −3.54E−05 | 1.32E−04 | −4.44E−04 | 9.05E−04 | −2.59E−03 |
| E | −7.33E−06 | −9.63E−07 | 5.29E−06 | −2.34E−05 | 5.85E−04 | 1.10E−03 | 3.10E−03 |
| F | 5.19E−07 | −2.17E−08 | −4.84E−07 | 1.94E−06 | −2.03E−04 | −5.01E−04 | −1.02E−03 |
| G | −1.60E−08 | 1.80E−09 | 1.82E−08 | −6.17E−08 | 2.48E−05 | 6.67E−05 | 1.15E−04 |
| H | 0.00E+00 | 0.00E+00 | 0.00E+00 | 0.00E+00 | 0.00E+00 | 0.00E+00 | 0.00E+00 |
| J | 0.00E+00 | 0.00E+00 | 0.00E+00 | 0.00E+00 | 0.00E+00 | 0.00E+00 | 0.00E+00 |
| L | 0.00E+00 | 0.00E+00 | 0.00E+00 | 0.00E+00 | 0.00E+00 | 0.00E+00 | 0.00E+00 |
| M | 0.00E+00 | 0.00E+00 | 0.00E+00 | 0.00E+00 | 0.00E+00 | 0.00E+00 | 0.00E+00 |
| N | 0.00E+00 | 0.00E+00 | 0.00E+00 | 0.00E+00 | 0.00E+00 | 0.00E+00 | 0.00E+00 |
| O | 0.00E+00 | 0.00E+00 | 0.00E+00 | 0.00E+00 | 0.00E+00 | 0.00E+00 | 0.00E+00 |
| P | 0.00E+00 | 0.00E+00 | 0.00E+00 | 0.00E+00 | 0.00E+00 | 0.00E+00 | 0.00E+00 |

| Surface | 12 | 13 | 14 | 15 | 16 | 17 | 18 |
|---|---|---|---|---|---|---|---|
| K | −1.91E+01 | 0.00E+00 | 0.00E+00 | 1.69E+00 | 8.63E+01 | −1.97E+01 | 1.89E+00 |
| A | −2.52E−04 | 0.00E+00 | 0.00E+00 | −1.56E−02 | −1.86E−04 | −8.17E−03 | −8.05E−03 |
| B | 3.23E−02 | 0.00E+00 | 0.00E+00 | 5.02E−02 | 3.81E−03 | 3.56E−02 | 4.11E−02 |

TABLE 14-continued

| | | | | | | | |
|---|---|---|---|---|---|---|---|
| C | −4.99E−02 | 0.00E+00 | 0.00E+00 | −9.26E−02 | −1.38E−02 | −8.08E−02 | −8.21E−02 |
| D | 4.24E−02 | 0.00E+00 | 0.00E+00 | 9.07E−02 | 1.72E−02 | 9.99E−02 | 9.07E−02 |
| E | −2.00E−02 | 0.00E+00 | 0.00E+00 | −4.75E−02 | −9.76E−03 | −7.14E−02 | −5.75E−02 |
| F | 4.91E−03 | 0.00E+00 | 0.00E+00 | 1.26E−02 | 2.62E−03 | 2.93E−02 | 2.04E−02 |
| G | −4.86E−04 | 0.00E+00 | 0.00E+00 | −1.34E−03 | −2.72E−04 | −6.41E−03 | −3.64E−03 |
| H | 0.00E+00 | 0.00E+00 | 0.00E+00 | 0.00E+00 | 0.00E+00 | 5.76E−04 | 2.43E−04 |
| J | 0.00E+00 | 0.00E+00 | 0.00E+00 | 0.00E+00 | 0.00E+00 | 0.00E+00 | 0.00E+00 |
| L | 0.00E+00 | 0.00E+00 | 0.00E+00 | 0.00E+00 | 0.00E+00 | 0.00E+00 | 0.00E+00 |
| M | 0.00E+00 | 0.00E+00 | 0.00E+00 | 0.00E+00 | 0.00E+00 | 0.00E+00 | 0.00E+00 |
| N | 0.00E+00 | 0.00E+00 | 0.00E+00 | 0.00E+00 | 0.00E+00 | 0.00E+00 | 0.00E+00 |
| O | 0.00E+00 | 0.00E+00 | 0.00E+00 | 0.00E+00 | 0.00E+00 | 0.00E+00 | 0.00E+00 |
| P | 0.00E+00 | 0.00E+00 | 0.00E+00 | 0.00E+00 | 0.00E+00 | 0.00E+00 | 0.00E+00 |

Eighth Embodiment

Figure 8A:
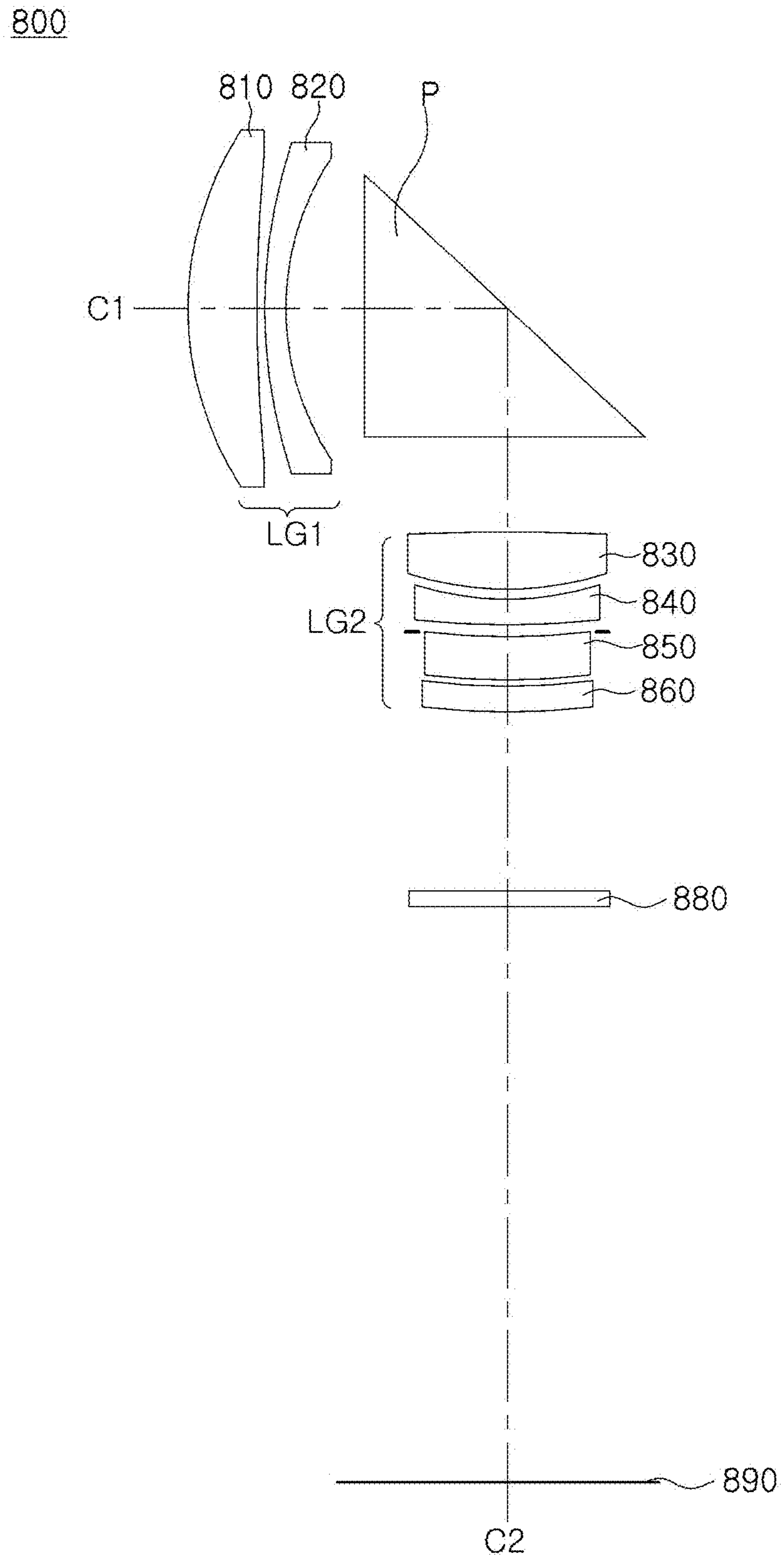
FIG. 8A is a configuration diagram illustrating an example optical imaging system in accordance with an eighth embodiment.
Figure 8B:
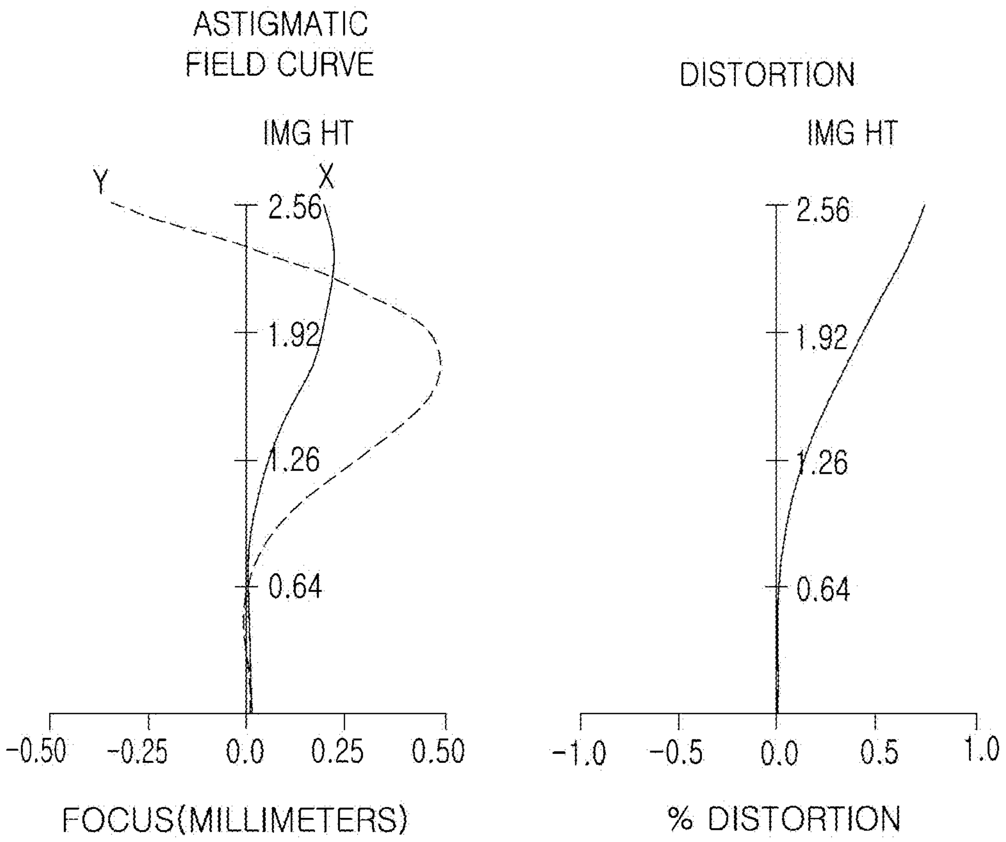
FIG. 8B is a graph indicating aberration properties of an example optical imaging system in accordance with the eighth embodiment.

FIG. 8A is a configuration diagram illustrating an example optical imaging system 800 according to an eighth embodiment. FIG. 8B is a graph illustrating aberration properties of the example optical imaging system according to the eighth embodiment.

The optical imaging system 800 according to the eighth embodiment may include a first lens 810, a second lens 820, a third lens 830, a fourth lens 840, a fifth lens 850 and a sixth lens 860 disposed in order from an object side to an imaging plane, and may further include an infrared blocking filter 880 and an image sensor 890 disposed on an image side of the sixth lens 860.

The first lens 810 may have positive refractive power. An object-side surface of the first lens 810 may be convex in a paraxial region, and an image-side surface of the first lens 810 may be concave in the paraxial region. The first lens 810 may be formed of a plastic material. The first lens 810 may be an aspherical lens. For example, an object-side surface and an image-side surface of the first lens 810 may be aspherical.

The second lens 820 may have negative refractive power. An object-side surface of the second lens 820 may be convex in a paraxial region, and an image-side surface of the second lens 820 may be concave in the paraxial region. The second lens 820 may be formed of a plastic material. Specifically, the second lens 820 may be formed of a plastic material having optical properties (e.g., a refractive index and an Abbe number) different from those of the first lens 810. The second lens 820 may be an aspherical lens. For example, an object-side surface and an image-side surface of the second lens 820 may be aspherical.

The third lens 830 may have positive refractive power. An object-side surface and an image-side surface of the third lens 830 may be convex in a paraxial region. The third lens 830 may be formed of a plastic material. Specifically, the third lens 830 may be formed of a plastic material having optical properties (e.g., a refractive index and an Abbe number) different from those of the second lens 820. The third lens 830 may be an aspherical lens. For example, an object-side surface and an image-side surface of the third lens 830 may be aspherical.

The fourth lens 840 may have negative refractive power. An object-side surface of the fourth lens 840 may be concave in a paraxial region, and an image-side surface of the fourth lens 840 may be convex in the paraxial region. The fourth lens 840 may be formed of a plastic material. Specifically, the fourth lens 840 may be formed of a plastic material having optical properties (e.g., a refractive index and an Abbe number) different from those of the third lens 830. The fourth lens 840 may be an aspherical lens. For example, an object-side surface and an image-side surface of the fourth lens 840 may be aspherical.

The fifth lens 850 may have negative refractive power. An object-side surface of the fifth lens 850 may be concave in a paraxial region, and an image-side surface of the fifth lens 850 may be convex in the paraxial region. The fifth lens 850 may be formed of a plastic material. Specifically, the fifth lens 850 may be formed of a plastic material having optical properties (e.g., a refractive index and an Abbe number) different from those of the fourth lens 840. The fifth lens 850 may be an aspherical lens. For example, an object-side surface and an image-side surface of the fifth lens 850 may be aspherical.

The sixth lens 860 may have negative refractive power. An object-side surface of the sixth lens 860 may be concave in a paraxial region, and an image-side surface of the sixth lens 860 may be convex in the paraxial region. The sixth lens 860 may be formed of a plastic material. Specifically, the sixth lens 860 may be formed of a plastic material having optical properties (e.g., a refractive index and an Abbe number) different from those of the fifth lens 850. The sixth lens 860 may be an aspherical lens. For example, an object-side surface and an image-side surface of the sixth lens 860 may be aspherical.

In an example prism P may be disposed between the second lens 820 and the third lens 830. The first lens 810 and the second lens 820, may be disposed on an object side with respect to the prism P, and may be included in the first lens group LG1, and the third lens to the sixth lens 830-860 may be disposed on an image side with respect to the prism P, and may be included in the second lens group LG2. The first lens group LG1 may have positive refractive power, and the second lens group LG2 may have negative refractive power.

Table 15 below lists optical and physical parameters of the example optical imaging system 800 according to the eighth embodiment.

TABLE 15

| Surface | Radius | Thickness/ Distance | Index | Abbe number | Semi-Aperture |
|---|---|---|---|---|---|
| Object | Infinity | Infinity | | | |
| 1 | Infinity | 0.000 | | | |
| 2 | 5.254 | 1.200 | 1.544 | 56.0 | 3.00 |
| 3 | 204.814 | 0.075 | | | 2.94 |
| 4 | 9.676 | 0.350 | 1.614 | 25.9 | 2.78 |
| 5 | 5.209 | 1.385 | | | 2.55 |
| 6 | Infinity | 2.250 | 1.834 | 37.3 | 2.10 |
| 7 | Infinity | 2.250 | 1.834 | 37.3 | 3.30 |
| 8 | Infinity | 2.250 | | | 1.76 |
| 9 | 33.367 | 0.838 | 1.660 | 20.4 | 1.67 |
| 10 | −6.165 | 0.146 | | | 1.59 |
| 11 | −4.340 | 0.460 | 1.639 | 23.5 | 1.53 |
| 12 | −17.960 | 0.232 | | | 1.44 |

TABLE 15-continued

| Surface | Radius | Thickness/ Distance | Index | Abbe number | Semi-Aperture |
|---|---|---|---|---|---|
| 13 | −7.977 | 0.658 | 1.635 | 24.0 | 1.42 |
| 14 | −21.254 | 0.151 | | | 1.39 |
| 15 | −9.357 | 0.444 | 1.544 | 56.0 | 1.38 |
| 16 | −10.930 | 3.000 | | | 1.42 |
| 17 | Infinity | 0.210 | 1.518 | 64.2 | 1.65 |
| 18 | Infinity | 9.789 | | | 1.67 |
| Image | Infinity | | | | 2.56 |

Table 16 below lists aspherical data of the example optical imaging system 800 according to the eighth embodiment.

TABLE 16

| Surface | 2 | 3 | 4 | 5 | 9 | 10 |
|---|---|---|---|---|---|---|
| K | 2.77E−01 | −1.00E+01 | −8.42E−01 | 5.45E−01 | −2.24E+01 | −2.73E+00 |
| A | −6.95E−04 | 7.58E−05 | −1.38E−03 | −2.39E−03 | −3.44E−04 | −1.19E−02 |
| B | 7.12E−04 | 4.43E−04 | −2.17E−04 | 6.32E−04 | 1.72E−03 | 1.35E−02 |
| C | −2.72E−04 | −1.48E−04 | 1.67E−04 | −3.38E−04 | −8.99E−04 | −7.65E−03 |
| D | 5.76E−05 | 2.02E−05 | −3.54E−05 | 1.32E−04 | −4.41E−04 | 8.97E−04 |
| E | −7.33E−06 | −9.64E−07 | 5.29E−06 | −2.34E−05 | 5.87E−04 | 1.10E−03 |
| F | 5.19E−07 | −2.18E−08 | −4.84E−07 | 1.94E−06 | −2.03E−04 | −5.01E−04 |
| G | −1.60E−08 | 1.79E−09 | 1.82E−08 | −6.17E−08 | 2.47E−05 | 6.67E−05 |
| H | 0.00E+00 | 0.00E+00 | 0.00E+00 | 0.00E+00 | 0.00E+00 | 0.00E+00 |
| J | 0.00E+00 | 0.00E+00 | 0.00E+00 | 0.00E+00 | 0.00E+00 | 0.00E+00 |
| L | 0.00E+00 | 0.00E+00 | 0.00E+00 | 0.00E+00 | 0.00E+00 | 0.00E+00 |
| M | 0.00E+00 | 0.00E+00 | 0.00E+00 | 0.00E+00 | 0.00E+00 | 0.00E+00 |
| N | 0.00E+00 | 0.00E+00 | 0.00E+00 | 0.00E+00 | 0.00E+00 | 0.00E+00 |
| O | 0.00E+00 | 0.00E+00 | 0.00E+00 | 0.00E+00 | 0.00E+00 | 0.00E+00 |
| P | 0.00E+00 | 0.00E+00 | 0.00E+00 | 0.00E+00 | 0.00E+00 | 0.00E+00 |

| Surface | 11 | 12 | 13 | 14 | 15 | 16 |
|---|---|---|---|---|---|---|
| K | −1.20E−01 | −2.96E+00 | 1.44E+00 | 7.90E+01 | −1.81E+01 | 1.11E−01 |
| A | 2.98E−04 | −4.30E−04 | −1.55E−02 | −1.39E−04 | −8.27E−03 | −7.87E−03 |
| B | 1.38E−02 | 3.24E−02 | 5.01E−02 | 3.85E−03 | 3.56E−02 | 4.09E−02 |
| C | −5.54E−03 | −4.98E−02 | −9.26E−02 | −1.38E−02 | −8.07E−02 | −8.22E−02 |
| D | −2.59E−03 | 4.24E−02 | 9.07E−02 | 1.72E−02 | 9.99E−02 | 9.07E−02 |
| E | 3.11E−03 | −2.00E−02 | −4.75E−02 | −9.75E−03 | −7.14E−02 | −5.75E−02 |
| F | −1.02E−03 | 4.91E−03 | 1.26E−02 | 2.62E−03 | 2.93E−02 | 2.04E−02 |
| G | 1.15E−04 | −4.86E−04 | −1.34E−03 | −2.72E−04 | −6.41E−03 | −3.64E−03 |
| H | 0.00E+00 | 0.00E+00 | 0.00E+00 | 0.00E+00 | 5.76E−04 | 2.43E−04 |
| J | 0.00E+00 | 0.00E+00 | 0.00E+00 | 0.00E+00 | 0.00E+00 | 0.00E+00 |
| L | 0.00E+00 | 0.00E+00 | 0.00E+00 | 0.00E+00 | 0.00E+00 | 0.00E+00 |
| M | 0.00E+00 | 0.00E+00 | 0.00E+00 | 0.00E+00 | 0.00E+00 | 0.00E+00 |
| N | 0.00E+00 | 0.00E+00 | 0.00E+00 | 0.00E+00 | 0.00E+00 | 0.00E+00 |
| O | 0.00E+00 | 0.00E+00 | 0.00E+00 | 0.00E+00 | 0.00E+00 | 0.00E+00 |
| P | 0.00E+00 | 0.00E+00 | 0.00E+00 | 0.00E+00 | 0.00E+00 | 0.00E+00 |

Ninth Embodiment

Figure 9A:
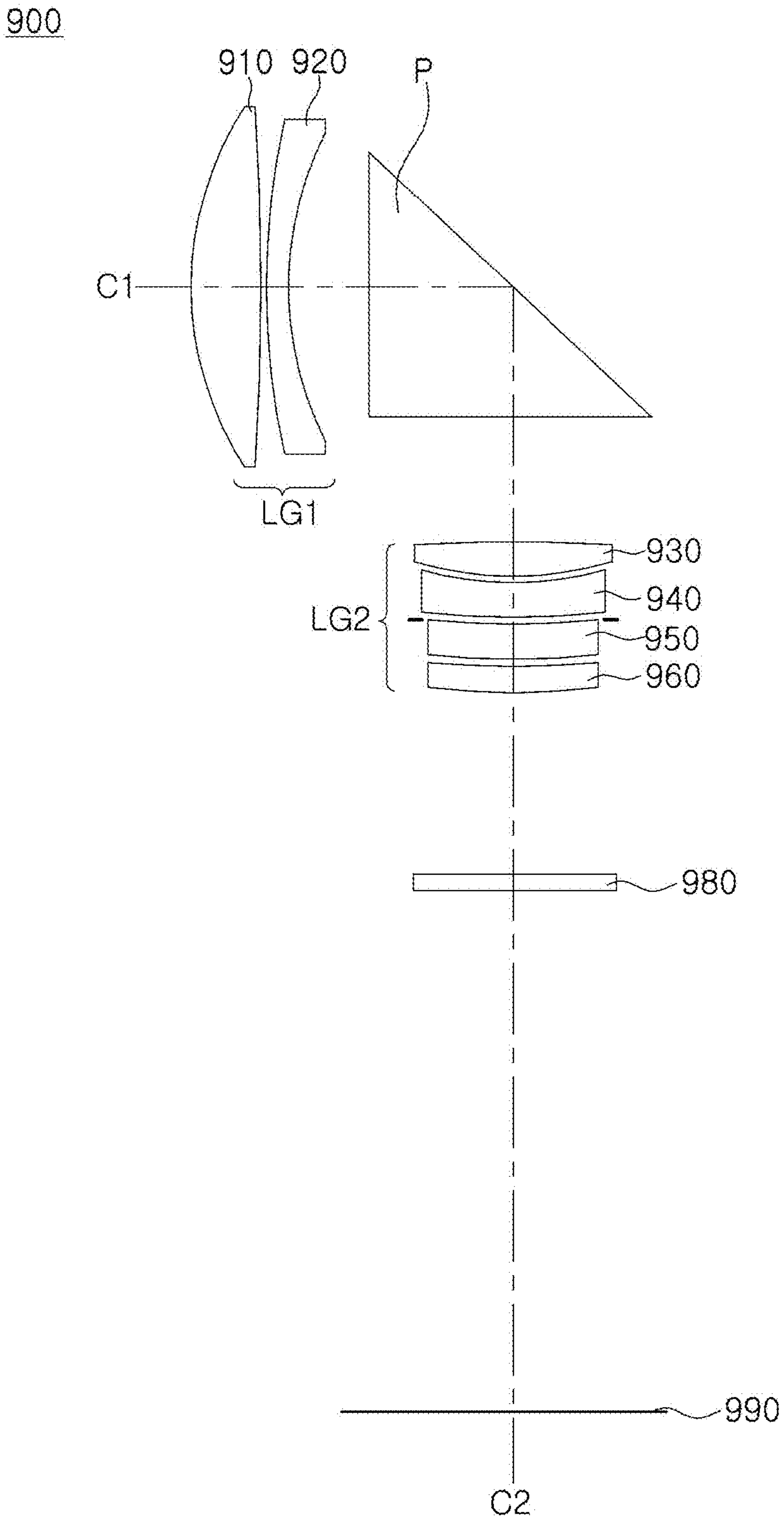
FIG. 9A is a configuration diagram illustrating an example optical imaging system in accordance with a ninth embodiment.
Figure 9B:
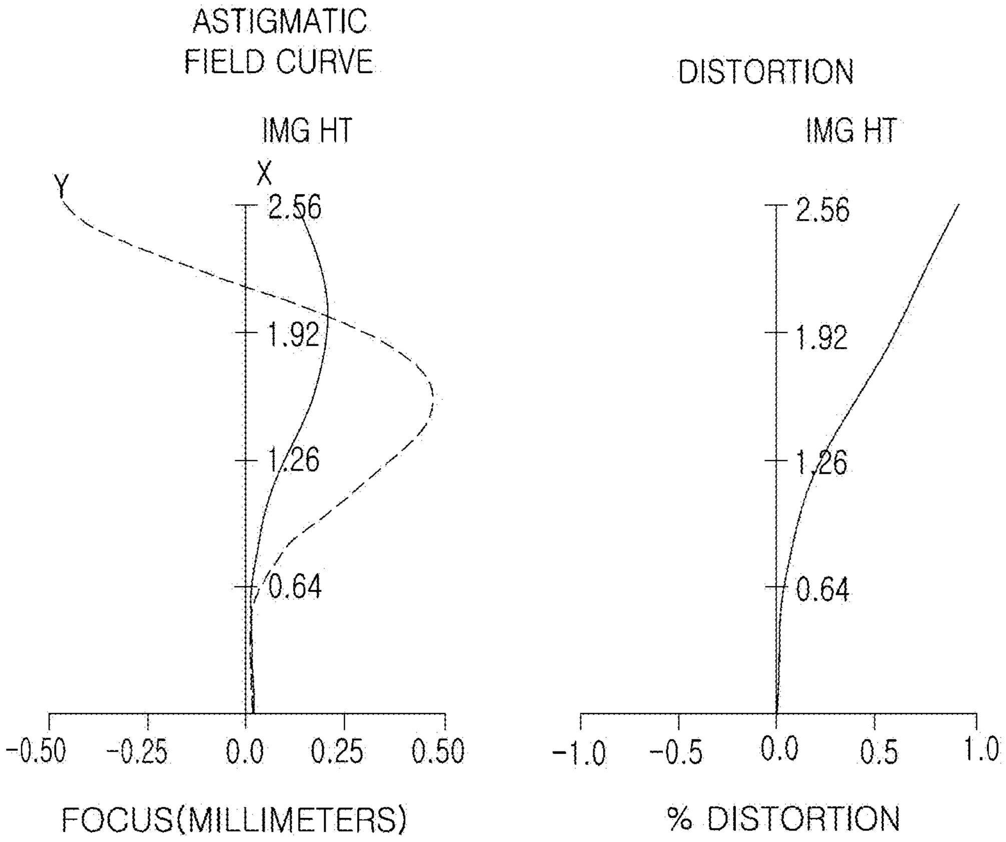
FIG. 9B is a graph indicating aberration properties of an example optical imaging system in accordance with the ninth embodiment.

FIG. 9A is a configuration diagram illustrating an example optical imaging system 900 according to a ninth embodiment. FIG. 9B is a graph illustrating aberration properties of the example optical imaging system according to the ninth embodiment.

The optical imaging system 900 according to the ninth embodiment may include a first lens 910, a second lens 920, a third lens 930, a fourth lens 940, a fifth lens 950 and a sixth lens 960 disposed in order from an object side to an imaging plane, and may further include an infrared blocking filter 980 and an image sensor 990 disposed on an image side of the sixth lens 960.

The first lens 910 may have positive refractive power. An object-side surface and an image-side surface of the first lens 910 may be convex in a paraxial region. The first lens 910 may be formed of a plastic material. The first lens 910 may be an aspherical lens. For example, an object-side surface and an image-side surface of the first lens 910 may be aspherical.

The second lens 920 may have negative refractive power. An object-side surface of the second lens 920 may be convex in a paraxial region, and an image-side surface of the second lens 920 may be concave in the paraxial region. The second lens 920 may be formed of a plastic material. Specifically, the second lens 920 may be formed of a plastic material having optical properties (e.g., a refractive index and an Abbe number) different from those of the first lens 910. The second lens 920 may be an aspherical lens. For example, an object-side surface and an image-side surface of the second lens 920 may be aspherical.

The third lens 930 may have positive refractive power. An object-side surface and an image-side surface of the third lens 930 may be convex in a paraxial region. The third lens 930 may be formed of a plastic material. Specifically, the third lens 930 may be formed of a plastic material having optical properties (e.g., a refractive index and an Abbe number) different from those of the second lens 920. The third lens 930 may be an aspherical lens. For example, an object-side surface and an image-side surface of the third lens 930 may be aspherical.

The fourth lens 940 may have negative refractive power. An object-side surface of the fourth lens 940 may be concave in a paraxial region, and an image-side surface of the fourth lens 940 may be convex in the paraxial region. The fourth lens 940 may be formed of a plastic material. Specifically, the fourth lens 940 may be formed of a plastic material having optical properties (e.g., different refractive index and Abbe number) different from those of the third lens 930. The fourth lens 940 may be an aspherical lens. For example, an object-side surface and an image-side surface of the fourth lens 940 may be aspherical.

The fifth lens 950 may have negative refractive power. An object-side surface of the fifth lens 950 may be concave in a paraxial region, and an image-side surface of the fifth lens 950 may be convex in the paraxial region. The fifth lens 950 may be formed of a plastic material. Specifically, the fifth lens 950 may be formed of a plastic material having optical properties (e.g., a refractive index and an Abbe number) different from those of the fourth lens 940. The fifth lens 950 may be an aspherical lens. For example, an object-side surface and an image-side surface of the fifth lens 950 may be aspherical.

The sixth lens 960 may have negative refractive power. An object-side surface of the sixth lens 960 may be concave in a paraxial region, and an image-side surface of the sixth lens 960 may be convex in the paraxial region. The sixth lens 960 may be formed of a plastic material. Specifically, the sixth lens 960 may be formed of a plastic material having optical properties (e.g., a refractive index and an Abbe number) different from those of the fifth lens 950. The sixth lens 960 may be an aspherical lens. For example, an object-side surface and an image-side surface of the sixth lens 960 may be aspherical.

In an example, a prism P may be disposed between the second lens 920 and the third lens 930. The first lens 910 and the second lens 920 may be disposed on an object side with respect to the prism P, and may be included in the first lens group LG1, and the third lens to the sixth lens 930-960 may be disposed on an image side with respect to the prism P, and may be included in the second lens group LG2. The first lens group LG1 may have positive refractive power, and the second lens group LG2 may have negative refractive power.

Table 17 below lists optical and physical parameters of the example optical imaging system 900 according to the ninth embodiment.

TABLE 17

| Surface | Radius | Thickness/ Distance | Index | Abbe number | Semi-Aperture |
|---|---|---|---|---|---|
| Object | Infinity | Infinity | | | |
| 1 | Infinity | 0.000 | | | |
| 2 | 5.302 | 1.200 | 1.544 | 56.0 | 3.00 |
| 3 | −111.028 | 0.075 | | | 2.95 |
| 4 | 12.666 | 0.350 | 1.614 | 25.9 | 2.80 |
| 5 | 5.950 | 1.385 | | | 2.59 |
| 6 | Infinity | 2.250 | 1.834 | 37.3 | 2.10 |
| 7 | Infinity | 2.250 | 1.834 | 37.3 | 3.30 |
| 8 | Infinity | 2.816 | | | 1.76 |
| 9 | 52.321 | 0.589 | 1.660 | 20.4 | 1.60 |
| 10 | −4.795 | 0.129 | | | 1.56 |
| 11 | −3.597 | 0.400 | 1.639 | 23.5 | 1.50 |
| 12 | −79.171 | 0.202 | | | 1.41 |
| 13 | −13.771 | 0.564 | 1.635 | 24.0 | 1.40 |
| 14 | −21.043 | 0.150 | | | 1.39 |
| 15 | −8.999 | 0.400 | 1.544 | 56.0 | 1.38 |
| 16 | −13.814 | 3.000 | | | 1.41 |
| 17 | Infinity | 0.210 | 1.518 | 64.2 | 1.67 |
| 18 | Infinity | 8.784 | | | 1.69 |
| Image | Infinity | | | | 2.56 |

Table 18 below lists aspherical data of the example optical imaging system 900 according to the ninth embodiment.

TABLE 18

| Surface | 2 | 3 | 4 | 5 | 9 | 10 |
|---|---|---|---|---|---|---|
| K | 2.62E−01 | −1.00E+01 | −1.40E+00 | 5.81E−01 | 3.00E+01 | −2.37E+00 |
| A | −7.29E−04 | 8.93E−05 | −1.44E−03 | −2.34E−03 | −4.06E−05 | −1.21E−02 |
| B | 7.12E−04 | 4.41E−04 | −2.22E−04 | 6.34E−04 | 1.74E−03 | 1.34E−02 |
| C | −2.72E−04 | −1.48E−04 | 1.66E−04 | −3.38E−04 | −9.20E−04 | −7.64E−03 |
| D | 5.76E−05 | 2.02E−05 | −3.55E−05 | 1.32E−04 | −4.49E−04 | 8.96E−04 |
| E | −7.33E−06 | −9.64E−07 | 5.28E−06 | −2.34E−05 | 5.91E−04 | 1.09E−03 |
| F | 5.19E−07 | −2.14E−08 | −4.86E−07 | 1.94E−06 | −2.03E−04 | −5.01E−04 |
| G | −1.60E−08 | 1.83E−09 | 1.83E−08 | −6.29E−08 | 2.47E−05 | 6.67E−05 |
| H | 0.00E+00 | 0.00E+00 | 0.00E+00 | 0.00E+00 | 0.00E+00 | 0.00E+00 |
| J | 0.00E+00 | 0.00E+00 | 0.00E+00 | 0.00E+00 | 0.00E+00 | 0.00E+00 |
| L | 0.00E+00 | 0.00E+00 | 0.00E+00 | 0.00E+00 | 0.00E+00 | 0.00E+00 |
| M | 0.00E+00 | 0.00E+00 | 0.00E+00 | 0.00E+00 | 0.00E+00 | 0.00E+00 |
| N | 0.00E+00 | 0.00E+00 | 0.00E+00 | 0.00E+00 | 0.00E+00 | 0.00E+00 |
| O | 0.00E+00 | 0.00E+00 | 0.00E+00 | 0.00E+00 | 0.00E+00 | 0.00E+00 |
| P | 0.00E+00 | 0.00E+00 | 0.00E+00 | 0.00E+00 | 0.00E+00 | 0.00E+00 |

| Surface | 11 | 12 | 13 | 14 | 15 | 16 |
|---|---|---|---|---|---|---|
| K | −9.81E−02 | 6.56E+00 | 9.73E−01 | 8.32E+01 | −1.84E+01 | −5.72E−01 |
| A | 2.62E−04 | −4.91E−04 | −1.55E−02 | −2.03E−04 | −8.27E−03 | −7.86E−03 |
| B | 1.37E−02 | 3.24E−02 | 5.02E−02 | 3.78E−03 | 3.57E−02 | 4.11E−02 |
| C | −5.58E−03 | −4.98E−02 | −9.25E−02 | −1.39E−02 | −8.06E−02 | −8.21E−02 |
| D | −2.60E−03 | 4.24E−02 | 9.07E−02 | 1.72E−02 | 9.99E−02 | 9.07E−02 |
| E | 3.11E−03 | −2.00E−02 | −4.75E−02 | −9.75E−3 | −7.14E−02 | −5.75E−02 |
| F | −1.02E−03 | 4.91E−03 | 1.26E−02 | 2.62E−03 | 2.93E−02 | 2.04E−02 |
| G | 1.15E−04 | −4.86E−04 | −1.34E−03 | −2.72E−04 | −6.41E−03 | −3.64E−03 |
| H | 0.00E+00 | 0.00E+00 | 0.00E+00 | 0.00E+00 | 5.76E−04 | 2.43E−04 |
| J | 0.00E+00 | 0.00E+00 | 0.00E+00 | 0.00E+00 | 0.00E+00 | 0.00E+00 |
| L | 0.00E+00 | 0.00E+00 | 0.00E+00 | 0.00E+00 | 0.00E+00 | 0.00E+00 |
| M | 0.00E+00 | 0.00E+00 | 0.00E+00 | 0.00E+00 | 0.00E+00 | 0.00E+00 |
| N | 0.00E+00 | 0.00E+00 | 0.00E+00 | 0.00E+00 | 0.00E+00 | 0.00E+00 |
| O | 0.00E+00 | 0.00E+00 | 0.00E+00 | 0.00E+00 | 0.00E+00 | 0.00E+00 |
| P | 0.00E+00 | 0.00E+00 | 0.00E+00 | 0.00E+00 | 0.00E+00 | 0.00E+00 |

Tenth Embodiment

Figure 10A:
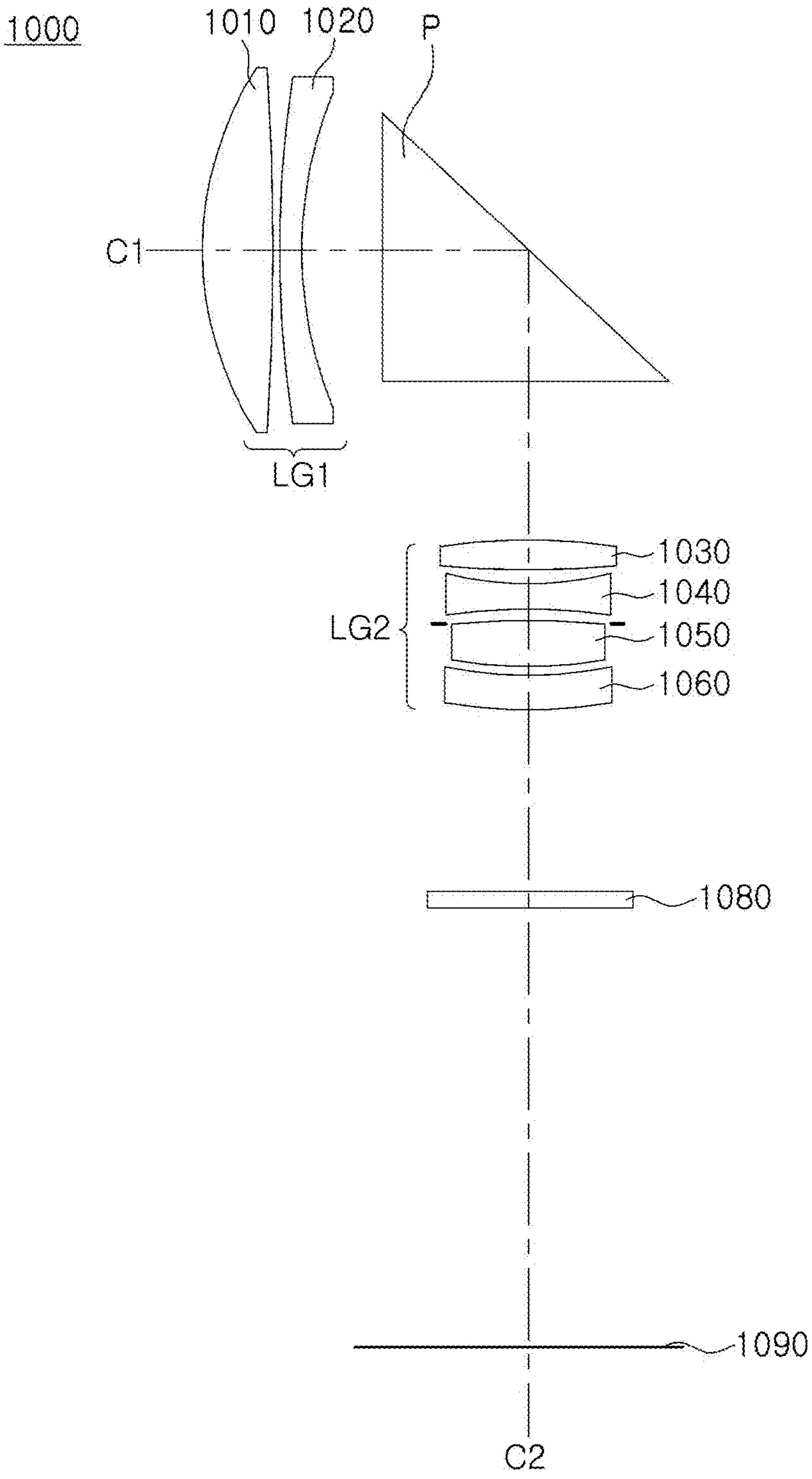
FIG. 10A is a configuration diagram illustrating an example optical imaging system in accordance with a tenth embodiment.
Figure 10B:
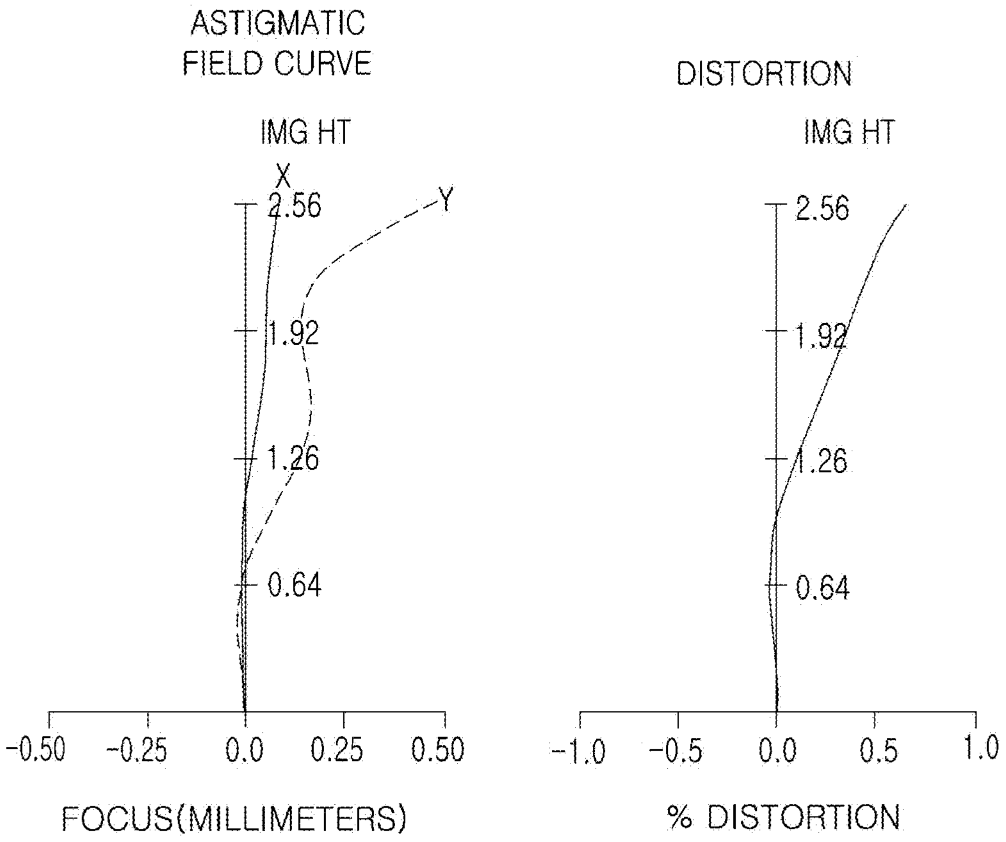
FIG. 10B is a graph indicating aberration properties of an example optical imaging system in accordance with the tenth embodiment.

FIG. 10A is a configuration diagram illustrating an example optical imaging system 1000 according to a tenth embodiment. FIG. 10B is a graph illustrating aberration properties of the example optical imaging system according to the tenth embodiment.

The optical imaging system 1000 according to the tenth embodiment may include a first lens 1010, a second lens 1020, a third lens 1030, a fourth lens 1040, a fifth lens 1050 and a sixth lens 1060 disposed in order from an object side toward an imaging plane, and may further include an infra-red blocking filter 1080 and an image sensor 1090 disposed on an image side of the sixth lens 1060.

The first lens 1010 may have positive refractive power. An object-side surface and an image-side surface of the first lens 1010 may be convex in a paraxial region. The first lens 1010 may be formed of a plastic material. The first lens 1010 may be an aspherical lens. For example, an object-side surface and an image-side surface of the first lens 1010 may be aspherical.

The second lens 1020 may have negative refractive power. An object-side surface of the second lens 1020 may be convex in a paraxial region, and an image-side surface of the second lens 1020 may be concave in the paraxial region. The second lens 1020 may be formed of a plastic material. Specifically, the second lens 1020 may be formed of a plastic material having optical properties (e.g., a refractive index and an Abbe number) different from those of the first lens 1010. The second lens 1020 may be an aspherical lens. For example, an object-side surface and an image-side surface of the second lens 1020 may be aspherical.

The third lens 1030 may have positive refractive power. An object-side surface and an image-side surface of the third lens 1030 may be convex in a paraxial region. The third lens 1030 may be formed of a plastic material. Specifically, the third lens 1030 may be formed of a plastic material having optical properties (e.g., a refractive index and an Abbe number) different from those of the second lens 1020. The third lens 1030 may be an aspherical lens. For example, an object-side surface and an image-side surface of the third lens 1030 may be aspherical.

The fourth lens 1040 may have negative refractive power. An object-side surface and an image-side surface of the fourth lens 1040 may be concave in a paraxial region. The fourth lens 1040 may be formed of a plastic material. Specifically, the fourth lens 1040 may be formed of a plastic material having optical properties (e.g., a refractive index and an Abbe number) different from those of the third lens 1030. The fourth lens 1040 may be an aspherical lens. For example, an object-side surface and an image-side surface of the fourth lens 1040 may be aspherical.

The fifth lens 1050 may have positive refractive power. An object-side surface and an image-side surface of the fifth lens 1050 may be convex in the paraxial region. The fifth lens 1050 may be formed of a plastic material. Specifically, the fifth lens 1050 may be formed of a plastic material having optical properties (e.g., a refractive index and an Abbe number) different from those of the fourth lens 1040. The fifth lens 1050 may be an aspherical lens. For example, an object-side surface and an image-side surface of the fifth lens 1050 may be aspherical.

The sixth lens 1060 may have negative refractive power. An object-side surface of the sixth lens 1060 may be concave in a paraxial region, and an image-side surface of the sixth lens 1060 may be convex in the paraxial region. The sixth lens 1060 may be formed of a plastic material. Specifically, the sixth lens 1060 may be formed of a plastic material having optical properties (e.g., a refractive index and an Abbe number) different from those of the fifth lens 1050. The sixth lens 1060 may be an aspherical lens. For example, an object-side surface and an image-side surface of the sixth lens 1060 may be aspherical.

In an example, a prism P may be disposed between the second lens 1020 and the third lens 1030. The first lens 1010 and the second lens 1020 may be disposed on an object side with respect to the prism P, and may be included in the first lens group LG1, and the third lens to the sixth lens 1030-1060 may be disposed on an image side with respect to the prism P, and may be included in the second lens group LG2. The first lens group LG1 may have positive refractive power, and the second lens group LG2 may have negative refractive power.

Table 19 below lists optical and physical parameters of the example optical imaging system 1000 according to the tenth embodiment.

TABLE 19

| Surface | Radius | Thickness/ Distance | Index | Abbe number | Semi-Aperture |
|---|---|---|---|---|---|
| Object | Infinity | Infinity | | | |
| 1 | Infinity | 0.000 | | | |
| 2 | 5.285 | 1.200 | 1.544 | 56.0 | 3.00 |
| 3 | −84.257 | 0.075 | | | 2.95 |
| 4 | 17.345 | 0.350 | 1.614 | 25.9 | 2.83 |
| 5 | 6.761 | 1.385 | | | 2.63 |
| 6 | Infinity | 2.250 | 1.834 | 37.3 | 2.10 |
| 7 | Infinity | 2.250 | 1.834 | 37.3 | 3.30 |
| 8 | Infinity | 3.401 | | | 1.76 |
| 9 | 7.078 | 0.522 | 1.660 | 20.4 | 1.46 |
| 10 | −23.351 | 0.219 | | | 1.40 |
| 11 | −4.534 | 0.400 | 1.639 | 23.5 | 1.36 |
| 12 | 7.689 | 0.212 | | | 1.24 |
| 13 | 19.161 | 0.700 | 1.635 | 24.0 | 1.26 |
| 14 | −19.672 | 0.167 | | | 1.30 |
| 15 | −7.833 | 0.533 | 1.544 | 56.0 | 1.38 |
| 16 | −15.803 | 3.000 | | | 1.37 |
| 17 | Infinity | 0.210 | 1.518 | 64.2 | 1.69 |
| 18 | Infinity | 7.207 | | | 1.71 |
| Image | Infinity | | | | 2.56 |

Table 20 below lists aspherical data of the example optical imaging system 1000 according to the tenth embodiment.

TABLE 20

| Surface | 2 | 3 | 4 | 5 | 9 | 10 |
|---|---|---|---|---|---|---|
| K | 2.42E−01 | −1.00E+01 | −9.35E−01 | 5.29E−01 | −1.22E+00 | 1.57E+02 |
| A | −8.15E−04 | 1.40E−04 | −1.47E−03 | −2.29E−03 | 1.25E−02 | −6.02E−04 |
| B | 7.24E−04 | 4.42E−04 | −2.18E−04 | 6.11E−04 | −1.31E−02 | −1.97E−03 |
| C | −2.73E−04 | −1.48E−04 | 1.66E−04 | −3.38E−04 | 7.51E−03 | 9.45E−04 |
| D | 5.75E−05 | 2.02E−05 | −3.55E−05 | 1.32E−04 | −9.38E−04 | 4.38E−04 |
| E | −7.33E−06 | −9.67E−07 | 5.29E−06 | −2.34E−05 | −1.10E−03 | −5.98E−04 |
| F | 5.19E−07 | −2.15E−08 | −4.84E−07 | 1.94E−06 | 5.06E−04 | 2.01E−04 |

TABLE 20-continued

| | | | | | | |
|---|---|---|---|---|---|---|
| G | −1.59E−08 | 1.98E−09 | 1.84E−08 | −6.16E−08 | −6.56E−05 | −2.17E−05 |
| H | 0.00E+00 | 0.00E+00 | 0.00E+00 | 0.00E+00 | 0.00E+00 | 0.00E+00 |
| J | 0.00E+00 | 0.00E+00 | 0.00E+00 | 0.00E+00 | 0.00E+00 | 0.00E+00 |
| L | 0.00E+00 | 0.00E+00 | 0.00E+00 | 0.00E+00 | 0.00E+00 | 0.00E+00 |
| M | 0.00E+00 | 0.00E+00 | 0.00E+00 | 0.00E+00 | 0.00E+00 | 0.00E+00 |
| N | 0.00E+00 | 0.00E+00 | 0.00E+00 | 0.00E+00 | 0.00E+00 | 0.00E+00 |
| O | 0.00E+00 | 0.00E+00 | 0.00E+00 | 0.00E+00 | 0.00E+00 | 0.00E+00 |
| P | 0.00E+00 | 0.00E+00 | 0.00E+00 | 0.00E+00 | 0.00E+00 | 0.00E+00 |
| Surface | 11 | 12 | 13 | 14 | 15 | 16 |
| K | −1.50E−01 | 1.20E+01 | −5.03E+02 | 9.90E+01 | −1.48E+01 | 5.55E+01 |
| A | 4.98E−04 | −4.70E−04 | −1.53E−02 | −1.14E−03 | −9.44E−03 | −1.05E−02 |
| B | 1.37E−02 | 3.25E−02 | 5.00E−02 | 3.93E−03 | 3.40E−02 | 4.14E−02 |
| C | −5.66E−03 | −4.94E−02 | −9.28E−02 | −1.38E−02 | −8.11E−02 | −8.24E−02 |
| D | −2.59E−03 | 4.24E−02 | 9.08E−02 | 1.71E−02 | 1.00E−01 | 9.05E−02 |
| E | 3.11E−03 | −2.01E−02 | −4.75E−02 | −9.79E−03 | −7.15E−02 | −5.74E−02 |
| F | −1.02E−03 | 4.91E−03 | 1.26E−02 | 2.62E−03 | 2.93E−02 | 2.04E−02 |
| G | 1.15E−04 | −4.86E−04 | −1.34E−03 | −2.72E−04 | −6.41E−03 | −3.64E−03 |
| H | 0.00E+00 | 0.00E+00 | 0.00E+00 | 0.00E+00 | 5.76E−04 | 2.43E−04 |
| J | 0.00E+00 | 0.00E+00 | 0.00E+00 | 0.00E+00 | 0.00E+00 | 0.00E+00 |
| L | 0.00E+00 | 0.00E+00 | 0.00E+00 | 0.00E+00 | 0.00E+00 | 0.00E+00 |
| M | 0.00E+00 | 0.00E+00 | 0.00E+00 | 0.00E+00 | 0.00E+00 | 0.00E+00 |
| N | 0.00E+00 | 0.00E+00 | 0.00E+00 | 0.00E+00 | 0.00E+00 | 0.00E+00 |
| O | 0.00E+00 | 0.00E+00 | 0.00E+00 | 0.00E+00 | 0.00E+00 | 0.00E+00 |
| P | 0.00E+00 | 0.00E+00 | 0.00E+00 | 0.00E+00 | 0.00E+00 | 0.00E+00 |

Table 21 below lists optical and physical parameters related to the focal length and the conditional expressions of the optical imaging system according to disclosed embodiments.

TABLE 21

| | Ex1 | Ex2 | Ex3 | Ex4 | Ex5 | Ex6 | Ex7 | Ex8 | Ex9 | Ex10 |
|---|---|---|---|---|---|---|---|---|---|---|
| f | 27.151 | 27.161 | 27.159 | 27.151 | 27.151 | 27.151 | 27.136 | 27.154 | 27.155 | 27.152 |
| f1 | 10.237 | 10.509 | 10.608 | 9.550 | 9.455 | 9.913 | 9.699 | 9.891 | 9.336 | 9.185 |
| f2 | −19.127 | −20.431 | −22.177 | −18.521 | −17.535 | −19.018 | −20.197 | −18.941 | −18.645 | −18.275 |
| f3 | 9.802 | 9.156 | −1800.630 | 8.526 | 7.816 | 9.155 | 8.709 | 7.951 | 6.683 | 8.286 |
| f4 | −11.860 | −11.687 | 8.830 | −10.369 | −13.685 | −10.702 | −7.958 | −9.076 | −5.878 | −4.407 |
| f5 | −20.127 | −16.189 | −11.711 | −18.991 | −10.400 | −19.826 | 115.241 | −20.504 | −64.704 | 15.394 |
| f6 | −186.273 | 220.206 | −15.414 | −67.882 | −124.358 | −149.036 | −30.916 | −132.715 | −48.890 | −29.239 |
| f7 | — | −113.845 | −126.504 | — | — | — | −54.587 | — | — | — |
| fLG1 | 19.000 | 18.857 | 17.991 | 17.204 | 17.724 | 18.000 | 16.500 | 18.000 | 16.500 | 16.356 |
| fLG2 | −28.740 | −26.118 | −23.705 | −21.701 | −20.970 | −16.365 | −19.815 | −26.830 | −19.560 | −16.424 |
| OAL | 25.278 | 25.159 | 25.520 | 25.049 | 24.525 | 25.395 | 25.041 | 25.688 | 24.754 | 24.081 |
| OAL1 | 5.260 | 5.260 | 5.260 | 5.260 | 5.260 | 5.260 | 5.260 | 5.260 | 5.260 | 5.260 |
| OAL2 | 20.018 | 19.899 | 20.260 | 19.789 | 19.265 | 20.135 | 19.781 | 20.428 | 19.494 | 18.821 |
| BFL | 12.680 | 12.158 | 12.236 | 12.272 | 11.234 | 12.822 | 11.732 | 12.999 | 11.994 | 10.417 |
| Fno | 4.710 | 4.690 | 4.680 | 4.670 | 4.670 | 4.811 | 4.670 | 4.860 | 4.680 | 4.680 |
| FOV | 10.67 | 10.67 | 10.67 | 10.65 | 10.66 | 10.66 | 10.66 | 10.67 | 10.65 | 10.66 |
| ODL3 | 2.13 | 2.16 | 2.23 | 2.12 | 2.02 | 2.05 | 2.08 | 2.07 | 2.00 | 1.86 |
| D1 | 6.00 | 6.00 | 6.00 | 6.00 | 6.00 | 6.00 | 6.00 | 6.00 | 6.00 | 6.00 |
| D2 | 3.46 | 3.52 | 3.66 | 3.44 | 3.24 | 3.30 | 3.36 | 3.34 | 3.20 | 2.92 |
| ImgH | 2.56 | 2.56 | 2.56 | 2.56 | 2.56 | 2.56 | 2.56 | 2.56 | 2.56 | 2.56 |
| dP1 | 2.250 | 2.250 | 2.250 | 2.250 | 2.250 | 2.250 | 2.250 | 2.250 | 2.250 | 2.250 |

According to the aforementioned embodiments, the optical imaging system according to the embodiments may have the effect of improving low-light imaging performance.

While this disclosure includes specific examples, it will be apparent after an understanding of the disclosure of this application that various changes in form and details may be made in these examples without departing from the spirit and scope of the claims and their equivalents. The examples described herein are to be considered in a descriptive sense only, and not for purposes of limitation. Descriptions of features or aspects in each example are to be considered as being applicable to similar features or aspects in other examples. Suitable results may be achieved if the described techniques are performed in a different order, and/or if components in a described system, architecture, device, or circuit are combined in a different manner, and/or replaced or supplemented by other components or their equivalents.

Therefore, in addition to the above and all drawing disclosures, the scope of the disclosure is also inclusive of the claims and their equivalents, i.e., all variations within the scope of the claims and their equivalents are to be construed as being included in the disclosure.

What is claimed is:

1. An optical imaging system, comprising:

a first lens group comprising a first lens having positive refractive power and a second lens having negative refractive power, disposed in a first optical axis direction;

a second lens group comprising a third lens having positive refractive power, a fourth lens having negative refractive power, a fifth lens having negative refractive power, and a sixth lens having refractive power, disposed in a second optical axis direction perpendicular to the first optical axis direction; and a prism disposed between the first lens group and the second lens group, and configured to convert a path of incident light from the first optical axis direction to the second optical axis direction, wherein a conditional expression $0.200 \le D1/OAL2 \le 0.500$ is satisfied, where D1 is a maximum effective diameter of the first lens group, and OAL2 is a distance on a second optical axis from a reflective surface of the prism to an imaging plane.

2. The optical imaging system of claim 1, wherein the second lens has a meniscus shape which is convex toward an object side.

3. The optical imaging system of claim 1, wherein a conditional expression $0.500 \le fLG1/f \le 0.800$ is satisfied, where fLG1 is a focal length of the first lens group, and f is a focal length of the optical imaging system.

4. The optical imaging system of claim 1, wherein a conditional expression $1.500 \le OAL1/ImgH \le 2.500$ is satisfied, where OAL1 is a distance on the first optical axis direction from an object-side surface of a lens of the first lens group, disposed the most adjacent to an object, to a reflective surface of the prism, and ImgH is half a diagonal length of an image plane.

5. The optical imaging system of claim 1, wherein a conditional expression $0.500 \le FOV/OAL2 \le 0.600$ (unit: $°\cdot mm^{-1}$) is satisfied, where FOV is a field of view of the optical imaging system.

6. The optical imaging system of claim 1, wherein a conditional expression $0.400 < D2/OAL1 \le 1.000$ is satisfied, where D2 is a maximum effective diameter of the second lens group, and OAL1 is a distance on a first optical axis from an object-side surface of a lens of the first lens group, disposed the most adjacent to an object, to a reflective surface of the prism.

7. The optical imaging system of claim 1, wherein the second lens group further comprises a seventh lens disposed on an image side of the sixth lens, and having negative refractive power.

8. An optical imaging system, comprising:

a first lens having positive refractive power, a second lens having negative refractive power, a third lens having positive refractive power, a fourth lens having negative refractive power, a fifth lens having negative refractive power, and a sixth lens having negative refractive power, and disposed in order from an object side toward an imaging plane; and a prism, disposed between the second lens and the third lens, and configured to convert a path of incident light from a first optical axis direction to a second optical axis direction, wherein the first lens and the second lens are disposed on an object side of the prism, and are comprised in a first lens group, and the third lens to the sixth lens are disposed on an image side of the prism, and are comprised in a second lens group, and wherein a conditional expression $0.400 < D2/OAL1 \le 1.000$ is satisfied, where D2 is a maximum effective diameter of the second lens group, and OAL1 is a distance on a first optical axis from an object-side surface of the first lens to a reflective surface of the prism.

9. The optical imaging system of claim 8, wherein the third lens has a convex object-side surface, and a convex image-side surface.

10. The optical imaging system of claim 8, wherein the fourth lens has a concave object-side surface, and a convex image-side surface.

11. The optical imaging system of claim 8, wherein the second lens group further comprises a seventh lens disposed on an image side of the sixth lens, and having negative refractive power.

12. The optical imaging system of claim 8, wherein the second lens has a meniscus shape which is convex toward an object side.

13. The optical imaging system of claim 8, wherein an object-side surface of the fifth lens is concave.

14. The optical imaging system of claim 8, wherein a conditional expression $0.200 \le OAL1/OAL2 \le 0.300$ is satisfied, where OAL2 is a distance on a second optical axis from a reflective surface of the prism to an image plane.

15. An optical imaging system, comprising:

a first lens group comprising a first lens having positive refractive power and a second lens having negative refractive power, disposed in a first optical axis direction;

a second lens group comprising a third lens having positive refractive power, a fourth lens having negative refractive power, a fifth lens having negative refractive power, and a sixth lens having negative refractive power, disposed in a second optical axis direction perpendicular to the first optical axis direction; and a prism disposed between the first lens group and the second lens group, and configured to convert a path of incident light from the first optical axis direction to the second optical axis direction, wherein the conditional expression $0.400 < D2/OAL1 \le 1.000$ is satisfied, where D2 is a maximum effective diameter of the second lens group, and OAL1 is a distance on a first optical axis from an object-side surface of the first lens to a reflective surface of the prism.

16. The optical imaging system of claim 15, wherein the first lens group comprises a first lens having a convex object-side surface, and a concave image-side surface.

17. The optical imaging system of claim 15, wherein the second lens group has negative refractive power.

* * * * *